(12) United States Patent
Thiry

(10) Patent No.: US 12,537,076 B2
(45) Date of Patent: Jan. 27, 2026

(54) COMPUTER IMPLEMENTED ENGINEERING MATERIALS MECHANICAL PROPERTY BASED SEARCH METHOD

(71) Applicant: EmTDLab Space Division S.A., Esch-sur-Alzette (LU)

(72) Inventor: Cedric Robert Thiry, Hong Kong Tai koo (CN)

(73) Assignee: EmTDLab Space Division S.A., Esch-sur-Alzette (LU)

( * ) Notice: Subject to any disclaimer, the term of this patent is extended or adjusted under 35 U.S.C. 154(b) by 320 days.

(21) Appl. No.: 18/039,853

(22) PCT Filed: Dec. 1, 2021

(86) PCT No.: PCT/EP2021/083805
§ 371 (c)(1),
(2) Date: Jun. 1, 2023

(87) PCT Pub. No.: WO2022/117664
PCT Pub. Date: Jun. 9, 2022

(65) Prior Publication Data
US 2024/0029833 A1      Jan. 25, 2024

(30) Foreign Application Priority Data
Dec. 4, 2020    (WO) ................ PCT/EP2020/084749

(51) Int. Cl.
*G06F 16/00*    (2019.01)
*G16C 20/40*    (2019.01)
*G16C 20/70*    (2019.01)

(52) U.S. Cl.
CPC .......... *G16C 20/40* (2019.02); *G16C 20/70* (2019.02)

(58) Field of Classification Search
CPC ................................ G06F 16/10; G06F 16/20
See application file for complete search history.

(56) References Cited

U.S. PATENT DOCUMENTS

| | | | |
|---|---|---|---|
| 2008/0050519 A1* | 2/2008 | Hubbuch | D05C 17/023 427/244 |
| 2010/0223276 A1* | 9/2010 | Al-Shameri | G06V 20/13 707/769 |
| 2015/0142730 A1* | 5/2015 | Dakshanamurthy | G16H 70/40 707/769 |

(Continued)

FOREIGN PATENT DOCUMENTS

WO      2020148918 A1      7/2020

OTHER PUBLICATIONS

Tu C. Le et al "Discovery and Optimization of Materials Using Evolutionary Approaches", Chemical Reviews, vol. 116, No. 10, May 12, 2016 (May 12, 2016), pp. 6107-6132, XP055735056, US ISSN: 0009-2665, DOI: 10.1021/acs.chemrev.5b00691.

(Continued)

*Primary Examiner* — Noosha Arjomandi
(74) *Attorney, Agent, or Firm* — DINSMORE & SHOHL LLP

(57) ABSTRACT

The invention pertains to the field of computer implemented or computer aided methods for systematic search (contrary to trial and error) for materials (material science, material informatics) in relation to structural/mechanical properties and preferably both radiation shielding and structural/mechanical properties.

27 Claims, 22 Drawing Sheets

(56) References Cited

U.S. PATENT DOCUMENTS

| | | | |
|---|---|---|---|
| 2020/0058376 A1* | 2/2020 | Dean | G16B 40/00 |
| 2020/0153001 A1* | 5/2020 | Keite-Telgenbüscher | C25B 9/19 |
| 2020/0257933 A1 | 8/2020 | Steingrimsson et al. | |
| 2022/0099566 A1* | 3/2022 | Murphy | G16C 20/20 |
| 2022/0305452 A1* | 9/2022 | Lejkowski | B01J 19/004 |
| 2023/0376581 A1* | 11/2023 | Shear | G06V 40/45 |
| 2023/0419086 A1* | 12/2023 | Pocajt | G06N 3/047 |

OTHER PUBLICATIONS

Yue Liu et al "Materials discovery and design using machine learning", Journal of Materiomics, vol. 3, No. 3, Sep. 1, 2017 (Sep. 1, 2017), pp. 159-177, XP055733800, ISSN: 2352-8478, DOI: 10.1016/j.jmat.2017.08.002.

Wei Jing et al "Machine learning in materials science", INFOMAT, vol. 1, No. 3, Sep. 1, 2019 (Sep. 1, 2019), pp. 338-358, XP055773907, ISSN: 2567-3165, DOI: 10.1002/inf2.12028.

Cai Yao et al "Comparison of two multi-objective optimization methods for composite radiation shielding materials", Applied Radiation and Isotopes, Elsevier, Oxford, GB, vol. 159, Feb. 14, 2020 (Feb. 14, 2020), XP086115703, ISSN: 0969-8043, DOI: 10.1016/J.APRADISO.2020.109061.

Johnson N S et al "Machine Learning for 1-15 Materials Developments in Metals Additive Manufacturing", arxiv .org, Cornell University Library, 201 Olin Library Cornell University Ithaca, NY 14853, May 11, 2020 (May 11, 2020), XP081667309.

Zhou Qiongh Ua et al "Property-Oriented Material Design Based on a Data-Driven Machine Learning Technique", A Journal of Physical Chemistry Letters, vol. 11, No. 10, Apr. 24, 2020 (Apr. 24, 2020), pp. 3920-3927, XP055827981, US ISSN: 1948-7185, DOI: 10.1021/acs.jpclett. 0c00665.

Laguerre tessellations and polycrystalline microstructures: A fast algorithm for generating grains of given volumes ", arxiv. org, Cornell University Library, 201 Olin Library Cornell University Ithaca, Ny 14853."

Dutta, et al., "Designing dual-phase steels with improved performance using ANN and GA in tandem", Computational Materials Science, Elsevier, Amsterdam, NL, vol. 1 57, Oct. 24, 2018 (Oct. 24, 2018), pp. 6-1 6, XP085539978, ISSN: 0927-0256, DOI: 1 0.1 01 6/J.COMMATSCI.201 8.1 0.020.

International Search Report regarding PCT/EP2020/084749 filed Dec. 4, 2020, mailed Aug. 10, 2021.

Written Opinion regarding PCT/EP2021/083805 filed Dec. 4, 2020, mailed Nov. 18, 2022.

* cited by examiner

COMPUTER IMPLEMENTED ENGINEERING MATERIALS MECHANICAL PROPERTY BASED SEARCH METHOD

CROSS REFERENCES TO RELATED APPLICATIONS

This application is a national-stage application under 35 U.S.C. § 371 of International Application No. PCT/EP2021/083805, filed Dec. 1, 2021, which claims benefit of priority to International Patent Application No. PCT/EP2020/084749, filed Dec. 4, 2020.

FIELD OF THE INVENTION

The invention pertains to the field of computer implemented or computer aided methods for systematic search (contrary to trial and error) for materials (material science, material informatics) in relation to structural/mechanical properties and preferably both radiation shielding and structural/mechanical properties.

BACKGROUND OF THE INVENTION

While systemic views in this field exist, they do not address all relevance aspects like composition-process-structure-property-performance.

Moreover for such systemic views addressing one or more aspects, no computer related methods are described.

State-of-the-art does not provide materials with appropriate mechanical properties; and does definitely not seek materials with both appropriate mechanical properties and reasonable shielding properties.

State-of-the-art does not provide materials with optimized volumetric densities; and does definitely not seek materials with both optimized volumetric densities and reasonable shielding properties.

Use of a method for systematic search of all the Mendeleev table, using evolutionary algorithms is known but does not consider all the challenges addressed in the field of the invention.

Techniques for the intrinsic energy calculation of a material exist but not for use in the search of a material, optimized for certain properties as the focus is to predict the crystal structure of a material as such.

Given the complexity of the matter, prior-art methods limit their scope to materials that are crystals and have the underlying assumption that the material properties are solely determined by the crystal structure, which is insufficient as approach. The focus of prior-art hence lies more in optimizing certain physical properties.

Moreover engineering materials are typically not made of pure crystals.

The state-of-the-art typically directly relies on the geometric information contained in the microstructure characterisation (images of the microstructure (MS) extracted using transmission electron microscopes (TEM), scanning electron microscope (SEM), electron backscatter diffraction (EBSD), X-ray diffraction (XRD) or by extrapolation of the microstructure using Crystal Structure Prediction methods (CSP). No link is made to the chemical composition of the material.

State-of-the art mechanical properties prediction typically uses methods such as Finite Element Analysis (FEA) or Computational Homogenization (CH) that are both computationally expensive techniques, while for a systemic search method allowing (mechanical) properties prediction, possibly a single run of that compute part of the algorithm is required.

State-of-the-art MS modelling typically directly extracts/predicts a geometric features such as "grain boundary" or "dislocation". No link is made to the chemical composition of the material. Moreover these techniques are limited to existing materials or replica of existing materials.

The state-of-the-art does not provide a mapping of the material domain into the microstructure domain. At best, phase textures (crystal grain orientation in the MS) are reproduced based on the trained convolutional neural network (c-NN). Composition cannot be deducted from the texture, while the chemical composition is a must have for optimising parameters for radiation shielding.

The state-of-the-art typically relies on either incomplete databases or neural networks that are not systematic in simultaneously searching and predicting physical (radiation) and mechanical properties (strength).

State-of-the-art typically provides methods to build layered structure to lower radiation energy transfer but those method are using empirically selected materials in their composition and only take one radiation shielding parameter into account.

State-of-the-art provides methods to lower radiation dose within a spacecraft by using the mass of object as a shield, but does not provide a method to optimise the spacecraft radiation shielding in a systematic way.

State-of-the-art typically directly provides methods to design radiation shields using only one radiation shielding parameter at a time but not a method to systematically distinguish and optimise for the two fundamental parameters.

State-of-the-art provides methods to design thermal, insulation and impact shielding that encompass radiation shielding (known as TRIPS—Thermal, Radiation, Impact Protective Systems) but does not provide a method to design a systematically optimised TRIPS.

State-of-the-art provides methods to design multilayer spacecraft shielding but those methods are based on empirical calculation to select the type, thickness and distance between those layers.

State-of-the-art provides methods to design generic radiation shielding but does not provide a systematic method to optimise the shield (using different chemical composition and layer design) based on specific radiation environment.

State-of-the-art provides methods to design radiation shielding typically considering the primary radiation (primary impact of the incoming particle onto the shield) but does not provide a method that can systematically handle the entire spectrum of primary radiation.

State-of-the-art provides methods to design radiation shielding typically considering the primary radiation (primary impact of the incoming particle onto the shield) but does not provide a method taking both primary and secondary radiation into consideration to optimise the shielding layers.

State-of-the-art provides methods to include a combination of properties unrelated to radiation shielding (but that serve related technical purposes) but those method are empirical and do not provide a systematic way to optimise the said multiple properties simultaneously.

AIM OF THE INVENTION

The invention aims to provide tractable methods for systematic search, using evolutionary and/or machine learning techniques for real-world engineering materials (satisfying real-world engineering constraints) in relation to both radiation shielding, preferably a plurality of relevant properties related thereto and/or structural/mechanical properties, preferably a plurality of relevant properties related thereto, by alleviating the a priori notion of crystal structure (prediction) in the related computations and/or avoiding inherent computationally expensive techniques in the optimisation iterations, while linking the radiation shielding and structural/mechanical domain via the chemical composition (inputs) and related material processing parameters.

SUMMARY OF THE INVENTION

The growing insight in physics and chemistry enables the use of computation in material science based thereon. Furthermore, the becoming available of a powerful architecture in terms of computation capability of computer systems and methods adapted for exploiting such computational power, strengthens this indicated use, even to bio-inspired computing, like evolutionary and genetic algorithms.

However, material science remains a complicated matter, and even with these growing insights and excellent computer systems and related methods, for tackling material science challenges, originating from real life and especially advanced uses therein, such use is not demonstrated yet. The state-of-the art in this field typically tackles a rather limited part of the mentioned challenge for a rather limited material class and these known methods are not shown to be scalable to real life situations, meaning producing solutions in a reasonable time, because scaling them for such advanced use would result in a computational situation being intractable for current computer systems.

It is the contribution of the invention to tackle the above situation by providing well selected methods and suitable integration thereof, more especially methods for computing certain properties of a material, such methods adapted for use in optimisation methods used for generating or defining of materials; and methods for generating or defining of materials, in terms of the material properties thereof, making use of the computational methods.

Materials are typically defined by their chemical composition, however more is needed as the processing steps applied to the material, results in structures, also denoted microstructures, which also determine certain properties of the material. Throughout the description, material and structure are therefore both used. With generating or defining of structures or hence materials, is meant seeking or seeking or search for its chemical composition and where appropriate, also material processing steps that can be applied to such chemical composition to obtain the desired or at least the predicted or computed properties.

While not limited thereto, the invention is extremely suited in the design of spacecraft's, spacecraft components such as on board Electrical, Electronic and Electromechanical (EEE) components or any other human-made device that need to resist space radiation.

In a first main theme in accordance with the invention, it is recognised that the computation of each (class) of properties requires a well selected approach, therefore the invention defines a class of physical properties, in particular (space) radiation related properties, in particular space radiation shielding properties and a class of structural (mechanical) properties. Moreover in an embodiment of the invention it is emphasised that for the class of physical properties (and for each of such property separate) a (simplified) physics-based formula is an appropriate approach while for the class of structural (mechanical) properties, a training model based approach (based on existing data) is the preferred approach instead.

In a second main theme of the invention it is recognized that often a single (layer of) structure (material) satisfying the requirements on the performance of the structure (material) in its use and translated into properties might not even exist, therefore the invention provides methods for generating or defining layered structures, meaning different layers of materials (which may and most likely are spaced apart), which may together be suitable for the task designed for.

This second aspect is extremely suited to tackle both primary and secondary radiation issues.

Indeed, the invention provides methods to optimise the properties of the layered structure to target both (1) primary incoming radiation, taking into account the full spectrum of primary radiation and (2) target the secondary radiation produced as an outcome of the primary radiation.

The advantageous technical effect of the invention is that the radiation dose, experienced by humans or equipment in the spacecraft using the determined structures as radiation shield, more in particular the total dose, more in particular total ionizing dose for electronics components, hence primary and secondary radiation is substantially lowered.

These two main themes can be and preferably are combined.

Throughout the description, the term property or objective mean the same. As mentioned above, reality cases require taking into account a plurality of properties of various kind, hence the optimisation methods are multi-objective optimisation methods. It is known that a property or objective can either become part of the objective function used or may appear as a constraint to be satisfied by the solution of the method instead or even both. It is also worth mentioning that a multi-objective optimisation can be performed by combining the objectives or properties for instance in a weighted sum formula.

In a first aspect of the invention a method is provided, carried out by a computer, for computing as radiation shielding property (130) of a structure, the nuclear fragmentation by said structure of high charge high energy particles (HZE) into lighter energy particles, based on information about the chemical composition, by (i) loading said chemical composition and (ii) computing (20) the material total nuclear fragmentation cross-section of said structure from said (loaded) chemical composition.

In a second aspect of the invention a method is provided, carried out by a computer, for computing as radiation shielding property (135) of a structure, the stopping power of said structure by ionisation energy loss, based on information about the chemical composition, by (i) loading said chemical composition and (ii) computing (25) the local energy deposition from the radiation to said structure, from said (loaded) chemical composition.

In a third aspect of the invention a method is provided, carried out by a computer, of generating one or more materials (and structures comprised thereof) (150), by defining their (finally selected) chemical composition, being based on an multi-objective optimisation method, the method comprising: (i) the computation of the first aspect and second aspect and (ii) performing an multi-objective optimisation method including as objectives both the (computed) nuclear fragmentation and the stopping power, preferably the method being based on evolutionary computation or optimisation algorithms such as genetic algorithms.

Contrary than in CAI YAO ET AL: "Comparison of two multi-objective optimisation methods for composite radiation shielding materials", APPLIED RADIATION AND ISOTOPES, ELSEVIER, OXFORD GB vol. 159, 14 Feb. 2020 (wherein material property is a given), in the invention an intrinsic property of the material is computed (hence from and based on its chemical composition).

In a fourth aspect of the invention a method is provided, carried out by a computer, for computing one or more structural properties (140, 150) of a structure, selected from the group of a list of mechanical or structural properties, based on information about the chemical composition, the method comprising: (i) loading information about the chemical composition, possibly only those considered, relevant for the geometric properties of said structure; and (ii) computing (50, 55) one or more structural properties of a structure based on said loaded information.

It is worth emphasizing that computing of structural properties via geometric aspects is not demonstrated in the state of the art.

A typical set of structural properties are:
Strength
Ductility
Modulus
Fracture toughness
Fatigue crack In an advanced embodiment one may further detail and hence separately compute one or more of such structural properties, leading to an extended structural property list:

Strength, tensile strength, ultimate tensile strength, specific strength, Yield strength, dynamic strength, creep strength, torsion strength, fatigue strength, Stress, strain, stress-strain Ductility, necking limit, relationship to hardness parameters Modulus, Young modulus, specific modulus Fracture toughness, brittle fracture Fatigue crack, fatigue crack growth, crack propagation As mentioned the computing of said one or more structural properties of a material is based on information about the chemical composition such as one or more of the following:

Grains, sub-grains/domains, second phases, molecular aggregates, intermetallic particles, precipitates particles, dispersoids particles, inclusions, and possible contaminants.

All these above information purely belong to the chemical domain, hence can be specifically isolated in that group.

As typical geometric features or properties or aspects thereof of said material, in particular those considered as those pertaining to the distribution and topological arrangement of:

Grain size, grain volume, grain boundary, interfaces, twin boundary, vacancies, dislocations, edge dislocations; All these above information purely belong to the geometric domain (including crystal defect at nano and microscale) hence can be specifically isolated in that group.

In a particular embodiment of this aspect, step (ii) comprises: (i) computing (500) geometric information (geometric features (image) or properties) of said material or structure; and (ii) computing (510) said structural properties of a structure from said geometric information by use of a trained model.

In a particular embodiment of this aspect, said step of computing geometric information of said structure comprises the step of generating a (3D-) geometric image, based on information about the chemical composition relevant therefore by use of a Laguerre-Voronoi Tessellation method, which result is being further enriched by information about the chemical composition, relevant for the geometric properties of said structure.

Information for enriching the geometric image can be one or more of the following: Selected from the group of: holes, voids, microvoids, cleavage facets, pores, porosities, cracks, microcracks, shrinkages, distortions, macro-aggregates, and all related defect densities such as voids density, pores density, etc.

In a fifth aspect of the invention a method is provided, carried out by a computer, of generating one or more materials or structures (150), by defining their (finally selected) chemical composition being based on an multi-objective optimisation method, the method comprising: (i) computing a plurality of structural properties and (ii) performing an multi-objective optimisation method including those computed structural properties as objectives, preferably the method being based on evolutionary computation or optimisation algorithms such as genetic algorithms.

The first, second, third and fourth and fifth aspect can be combined, resulting in a method, carried out by a computer, of generating one or more materials or structures, by defining their (finally selected) chemical composition being based on an multi-objective optimisation method, the method comprising: (i) computing a plurality of objectives, with at least one radiation shielding property and at least one structural property, preferably at least two radiation shielding properties and at least two structural properties; and performing an multi-objective optimisation method based on said computed objectives, preferably the method being based on evolutionary computation or optimisation algorithms such as genetic algorithms.

The method may be adapted for taking into account primary and secondary radiation aspects by using them on a plurality of layers.

The methods may and preferably are supported by training methods, in particular a method, carried out by a computer, of training a model (700) suitable for use in computing for a given structure geometry the structural properties, said training of said model being based on (i) loading information of a plurality of given structure geometries and their related structure properties and (ii) training the model based on said loaded information, wherein said model preferably being one or more (convolutional) neural networks and/or a method, carried out by a computer, of training a model (800), suitable for use in computing for a given chemical composition geometry generating relevant information, said training of said model being based on (i) loading information of a plurality of given chemical composition and their structure geometries and (ii) training said model based on said loaded information, wherein said model preferably being one or more (convolutional) neural networks.

Finally it is worth mentioning that besides determining the materials, the methods may also output the computed properties, which may be useful for further post processing of the materials (when made) and/or feeding other simulation methods used further in the process as part of post processing.

Hence the invention also provides a method for actual delivering the material by feeding the outputs like the material processing parameters to manufacturing equipment like a 3D printer to actually generate the structures with the searched input materials.

It is worth noting here that US2020/257933A1 does not entail a search method, especially one, wherein required material processing steps are taken into account as part of the optimisation as input variable. Further this state of art does not rely on information pertaining to the presence of intermetallics, impurities, aggregates or porosities (as it does not include the use of computing structural properties via a geometric approach).

The invention provides hence a search method, carried out by a computer, for determining one or more materials (150), by outputting their finally selected chemical composition and required material (industrial) processing steps such as melting, casting, extrusion, moulding etc. (1041), powder sintering (1042), heat treatment (1043), shaping/forming (1044), solidification (1045) and mechanical processing (1046), these being selected by an optimisation method, the method comprising: (i) computing one or more structural properties, selected from a predefined group of and (ii) performing an optimisation method including those computed structural properties as objectives, preferably the method being based on evolutionary computation or optimisation algorithms such as genetic algorithms, wherein said compute step (i) being based on a method, for computing said one or more structural properties (140, 150) of a material, based on information about the chemical composition, in particular those listed before and to be applied material processing steps, the method comprising: (i) loading information about the chemical composition and material processing steps; and (ii) computing (50, 55) one or more structural properties of a material based on said loaded information.

It is worth emphasizing there that the invention goes beyond a "crystallographic world" view in that besides information like grains, sub-grains, second phases used in that world, also information not pertaining to that world is loaded in the invention such as domain structure, molecular aggregates, intermetallic particles, precipitates particles, dispersoids particles, inclusions, and possible contaminants.

The invention in particular provides that step (i) comprising: (i) computing (500) geometric information, like an image or geometric features or properties thereof of said material, in particular those pertaining to the distribution and topological arrangement in particular those as listed before from the chemical composition and required material processing steps; and (ii) computing (510) said structural properties of a structure from said geometric information by use of a first trained model.

The invention in particular provides said step of computing geometric information of said structure comprising: (i) the step of computing geometry generating information (which is the information required to generate a geometric image by use of a Laguerre-Voronoi Tessellation method) from the chemical composition and required material processing steps by use of a second trained model and (ii) the step of generating a (3D-) geometric image, based on the computed geometry generating information by use of a Laguerre-Voronoi Tessellation method.

The invention in particular provides the step of generating a (3D-) geometric image, based on information further comprises the step of enriching (e.g. by addition) the (in the previous step) obtained (3D-) geometric image, said enriched information being computed from the chemical composition and required material processing steps by use of a third trained model.

Further the invention describes
  a method, carried out by a computer, of training a model for computing for a given chemical composition (of a material) and applied material processing steps, geometry generating information (of said material) (such as enrichment information), said model, inputted with chemical composition and applied material processing steps and outputting geometry generating information, said training of said model being based on (i) loading a plurality of chemical compositions and applied material processing steps and their related geometry generating information and (ii) training, by adapting the model parameters, the model, based on said loaded information by comparing the output provided by the model with the loaded information (in that the difference between the output and the loaded information needs to be minimized), whereby the geometry generating relevant information is suited for generating a (3D-) geometric image (of said material) and/or adding thereto in the case of enrichment information. One may perform this method a first time for geometry generating information directly useful for generating the image and a second time for enrichment information.

A method, carried out by a computer, of training a model for computing for a given image (of a material) geometry generating information, said model, inputted with images and outputting corresponding geometry generating information, said training of said model being based on the steps of: (i) loading a plurality of images, (ii) generate by the model corresponding geometry generating information, (iii) generate a (3D-) geometric image, based on the by the model generated corresponding geometry generating information and (iv) training, by adapting the model parameters, the model, based on said loaded information by comparing the generated image with the loaded images (in that the difference between the output and the loaded information needs to be minimized).

A method, carried out by a computer, of training a model for computing for a given geometric information, like an image (of a material) a structural parameter (of said material), said model, inputted with geometric information like images and outputting a structural parameter, said training of said model being based on (i) loading a plurality of geometric information, like images and their related structural parameter and (ii) training, by adapting the model parameters, the model based on said loaded information by comparing the output provided by the model with the loaded information (in that the difference between the output and the loaded information needs to be minimized).

The above methods are used for

A search method, carried out by a computer, for determining one or more materials (150), by outputting their selected chemical composition and material processing steps, being selected by an optimisation method, the method comprising: (1) performing an optimisation method, comprising (i) computing one or more structural properties, selected from the group as listed before and (ii) performing an optimisation method including those computed structural properties as objectives, preferably the method being based on evolutionary computation or optimisation algorithms such as genetic algorithms, wherein said compute step (i) being based on a method, for computing one or more structural properties (140, 150) of a structure, based on geometry generating information, in particular by generating a geometric image, based on the geometry generating information and computing (510) said structural properties of a structure from said geometric information by use of a first trained model by use of a Laguerre-Voronoi Tessellation method and thereafter (2), determining the chemical composition and material processing steps, related to said geometry generating information by use of a second trained model (by use of an inversion of a predetermined model).

A search method, carried out by a computer, for determining one or more materials (150), by outputting their finally selected chemical composition (150), being selected by an optimisation method, the method comprising: performing an optimisation method including a computed radiation shielding property as objective, the method being based on evolutionary computation or optimisation algorithms such as genetic algorithms, wherein said compute step (i) being based on a method, for computing at least one radiation shielding property of a material, based on information about the chemical composition, the method comprising: (i) loading information about the chemical composition; and (ii) computing (50, 55) at least one radiation shielding property of a material based on said loaded information.

The invention provides an embodiment wherein at least two radiation shielding properties are computed (irrespectively whether one of those radiation shielding properties may be part of the other); and said optimisation method is a multi-objective optimisation method, based on all said computed objectives (to thereby be able to emphasize their relative importance within the optimisation method).

The invention provides an embodiment further comprising computing the material (Gibbs) free energy, like the formation enthalpy, from said chemical composition and said optimisation method, is based on all said computed objectives and said material (Gibbs) free energy (to thereby be able to determine thermodynamically stable materials).

The invention provides a method, carried out by a computer, of training a model for computing for a given chemical composition the material density, said model, inputted with chemical composition and outputting material density, said training of said model being based on (i) loading information of a plurality of given chemical compositions and their related material density and (ii) training by adapting the model parameters, the model based on said loaded information by comparing the output provided by the model with the loaded information (in that the difference between the output and the loaded information needs to be minimized).

DETAILED DESCRIPTION OF THE INVENTION

Figure 1:
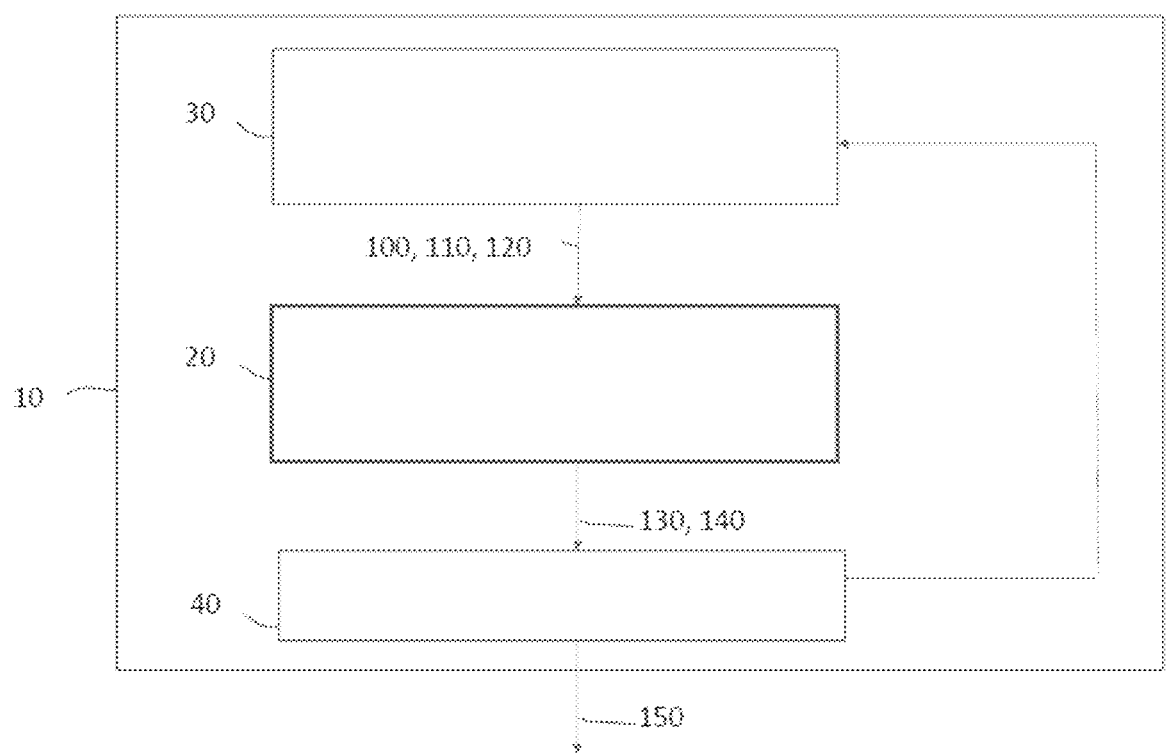
FIG. 1 shows a schematic representation of an (iterative) optimisation method (10) of or for generating one or more structures.

The growing insight in physics and chemistry (or the underlying physics of chemistry) enables the use of computation in material science based thereon. Furthermore, the becoming available of a powerful in term of computation capability (number of floating point operations per second, random-access memory size, central processing units and graphic processing architecture such as multi-core processor, multi-threading, open-source artificial intelligence libraries) of computer systems and methods adapted for exploiting such computation power, strengthens this indicated use, even to bio-inspired computing, like evolutionary and genetic algorithms.

However, material science remains a complicated matter, and even with these growing insights and excellent computer systems and related methods, for tackling material science challenges, originating from real life (engineering) and especially advanced uses therein (like the field of (space) radiation), such use is not demonstrated yet. The state of the art in this field typical tackles a rather limited part of the mentioned challenge for a rather limited material class and these known methods are not shown to be scalable to real life situations, meaning producing solutions in a reasonable time, because scaling them for such advanced use would result in a computational situation being in intractable for current computer systems.

It is the contribution of the invention to tackle the above situation by providing well selected methods and suitable integration thereof, more especially methods for computing certain (relevant) properties of a structure, such methods adapted for use in optimisation methods used for generating or defining of structures; and methods for generating or defining of structures, in terms of the material properties thereof, making use of the computation methods.

The invention pertains to computer implemented or computer assisted generating of structures and hence require computation steps either as part of property computations or predictions or as part of the optimisation method employed on a computer environment or system. Optimisation methods use typically iterative processes and hence the compute steps are executed also iteratively. Computation can be performed by computing a given deterministic or by physics inspired formula, selected to be sufficiently accurate while still being tractable or by use of a training model, representative for a well selected data set using techniques from machine learning for those situations where suitable formula do not exist.

While not limited thereto, the invention is extremely suited in the design of space crafts, spacecraft components or any other human-made device that need to resist space radiation.

The invention hence target (space) radiation, more in particular outer space radiation (contrary to electro-magnetic fields). For completeness, with space radiation may include primary and secondary radiation.

In a first theme of the invention it is recognized that the computation of each (class) of properties requires a well selected approach, therefore the invention defines a class of physical properties, in particular (space) radiation related properties, in particular space radiation shielding properties and a class of structural (mechanical) properties. Moreover in an embodiment of the invention it is emphasized that for the class of physical properties (and for each of such property separate) a (simplified) physics-based formula is an appropriate approach while for the class of structural (mechanical) properties a training model based approach (based on existing data) is the preferred approach instead.

In a second theme of the invention it is recognized that often a single (layer of) structure (material) satisfying the requirements on the performance of the structure (material) in its use and translated into properties might not even exist, therefore the invention provides methods for generating or defining layered structures, meaning different layers of materials (which may and most likely are spaced apart), which may together be suitable for the task designed for.

This second theme is extremely suited to tackle both primary and secondary radiation issues.

Indeed the invention provides methods to optimize the properties of the layered structure to target both (1) primary incoming radiation, taking into account the full spectrum of primary radiation and (2) target the secondary radiation produced as an outcome of the primary radiation.

The advantageous technical effect of the invention is that the radiation dose, experienced by humans or equipment in the space craft using the determined structures as radiation shield, more in particular the total dose, hence primary and secondary radiation is substantially lowered.

These two main themes can be and preferably are combined.

Throughout the description the term property or objective mean the same. As mentioned above, reality cases require taking into account a plurality of properties of various kind, hence the optimisation methods are multi-objective optimisation methods. It is known that a property or objective can either become part of the objective function used or may appear as a constraint to be satisfied by the solution of the method instead or even both.

The invention is now first described via the related Figures.

FIG. 1 shows a schematic representation of an (iterative) optimisation method (10) of or for generating one or more materials and/or structures, based on a property compute step (20), based on chemical information (100), (110), (120) and resulting in one or more properties (130, 140), which may be of a different kind. An optimisation method typically has an evaluation step (40), e.g. by use of a fitness function. If positive, the generated or selected structure (150) is outputted, otherwise another iteration starts, with a step (30) providing chemical information(s). While the above reflects how this operates in reality, in principle one may say the properties are computed and the optimisation methods thereafter are performed to select the most suitable one(s). For the sake of completeness, in the iterative procedure, one may evaluate a plurality of materials and/or structures in parallel.

Figure 2:
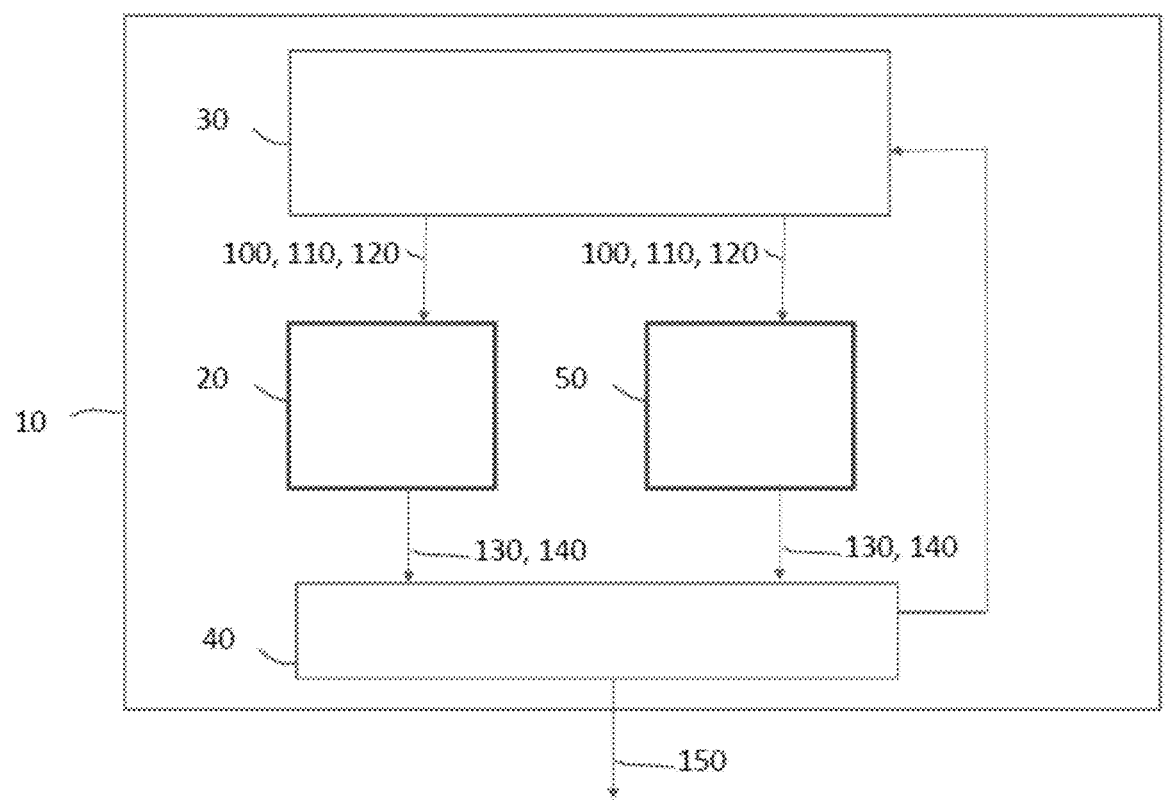
FIG. 2 shows a schematic representation of an (iterative) optimisation method (10) of or for generating one or more structures, related to a plurality of distinct property compute steps (20) and (50) for different properties.

FIG. 2 shows a schematic representation of an (iterative) optimisation method (10) of or for generating one or more structures, emphasizing that there are a plurality of distinct property compute steps (20) and (50) for different properties, which can be of the same kind (radiation related or mechanical related) or of a different kind.

Figure 3:
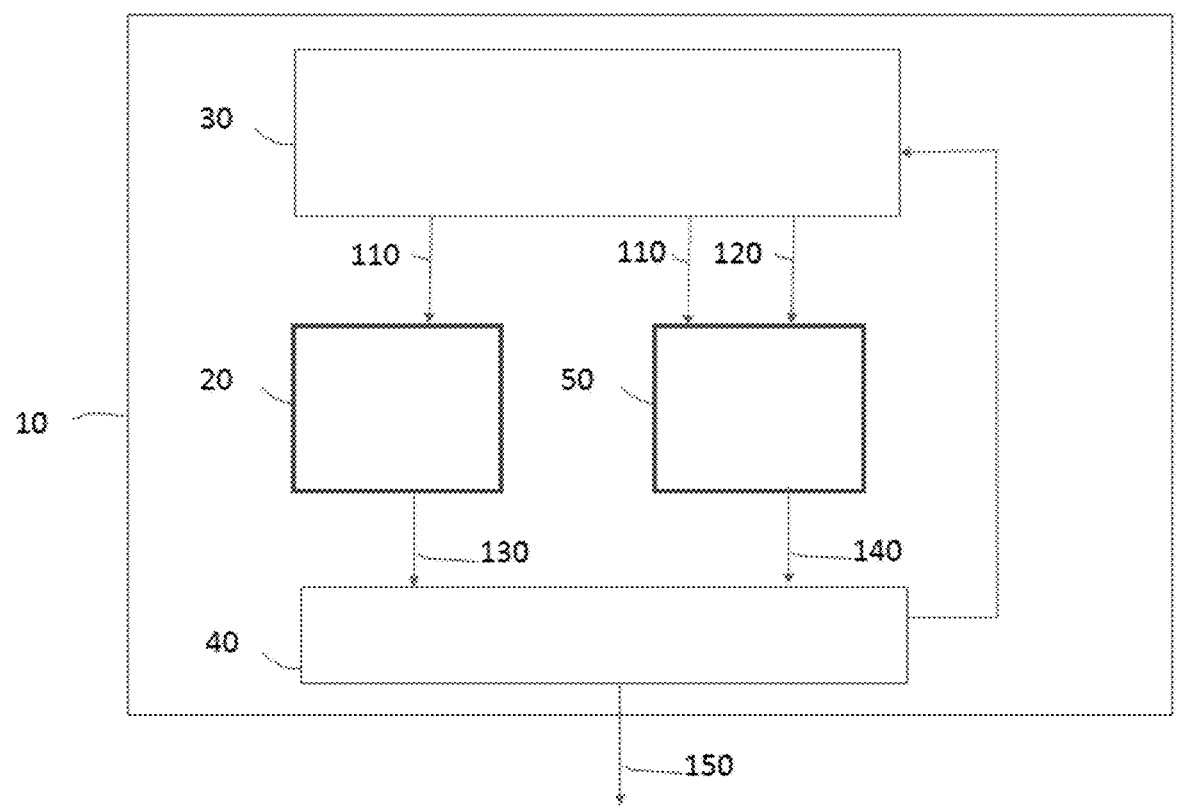
FIG. 3 shows a schematic representation of an (iterative) optimisation method (10) of or for generating one or more structures, emphasizing that the used input for compute steps can and preferably are also different. In dotted lines a preferred embodiment is shown, indicating that geometric info is not used for the radiation properties while for the mechanical properties both geometric and chemical info is used.

FIG. 3 shows a schematic representation of an (iterative) optimisation method (10) of or for generating one or more materials and/or structures, emphasizing that there are a plurality of distinct property compute steps (20) and (50) for different properties of a different kind, more in particular that the used input for such compute steps are also different, especially respectively the chemical composition information (110), relevant for the radiation properties (130) or the chemical composition information (140) for the geometric properties of said material and/or structure (150).

Figure 4:
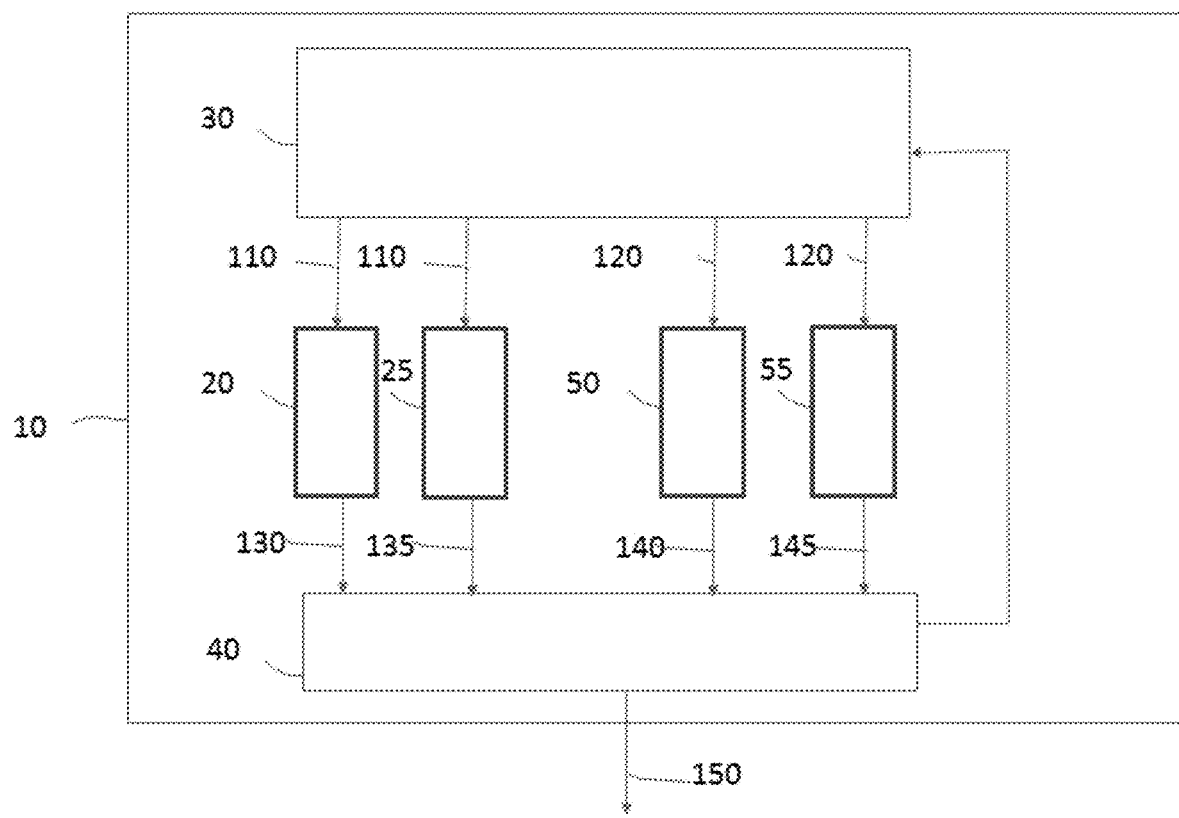
FIG. 4 shows a schematic representation of an (iterative) optimisation method (10) of or for generating one or more structures, combining the notions of FIGS. 2 and 3.

FIG. 4 shows a schematic representation of an (iterative) optimisation method (10) of or for generating one or more structures, combining the notions of FIGS. 2 and 3, in that a plurality of properties of a same kind, based on the same type of information and a plurality of properties of a other kind, based on a suitable type of information therefore are used. What is not shown is the computation of auxiliary information like energy or stability properties and/or density of the structured used for steering the optimisation method.

Figure 5:
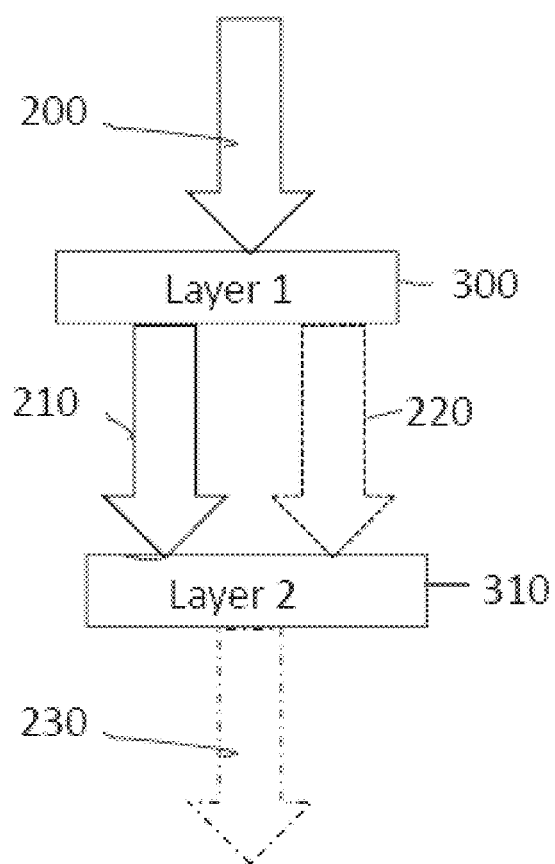
FIG. 5 provides a layered structure with spaced apart layers (300, 310), to be determined by the method discussed in FIGS. 1 to 4.

FIG. 5 provides a shield comprising different layers of shields, hence a resulting in a layered material or layered structure with spaced apart layers (300, 310), to be determined by the method discussed in FIGS. 1 to 4, wherein the incident radiation (200) is shown, the passed through primary radiation (210) if any, the secondary radiation (220), which might get generated in layer (300) due to the incident radiation and finally the resulting radiation (230) if any, which defined the dose experienced by humans, animal or any other living organism that has to cope with the resulting total effective dose and/or equipment (like electronics, which needs to cope with the ionizing dose) relying on the shield. In essence a material is sought for each of said layers. The amount of phases of such material might and most probably is different per layer.

Figure 6:
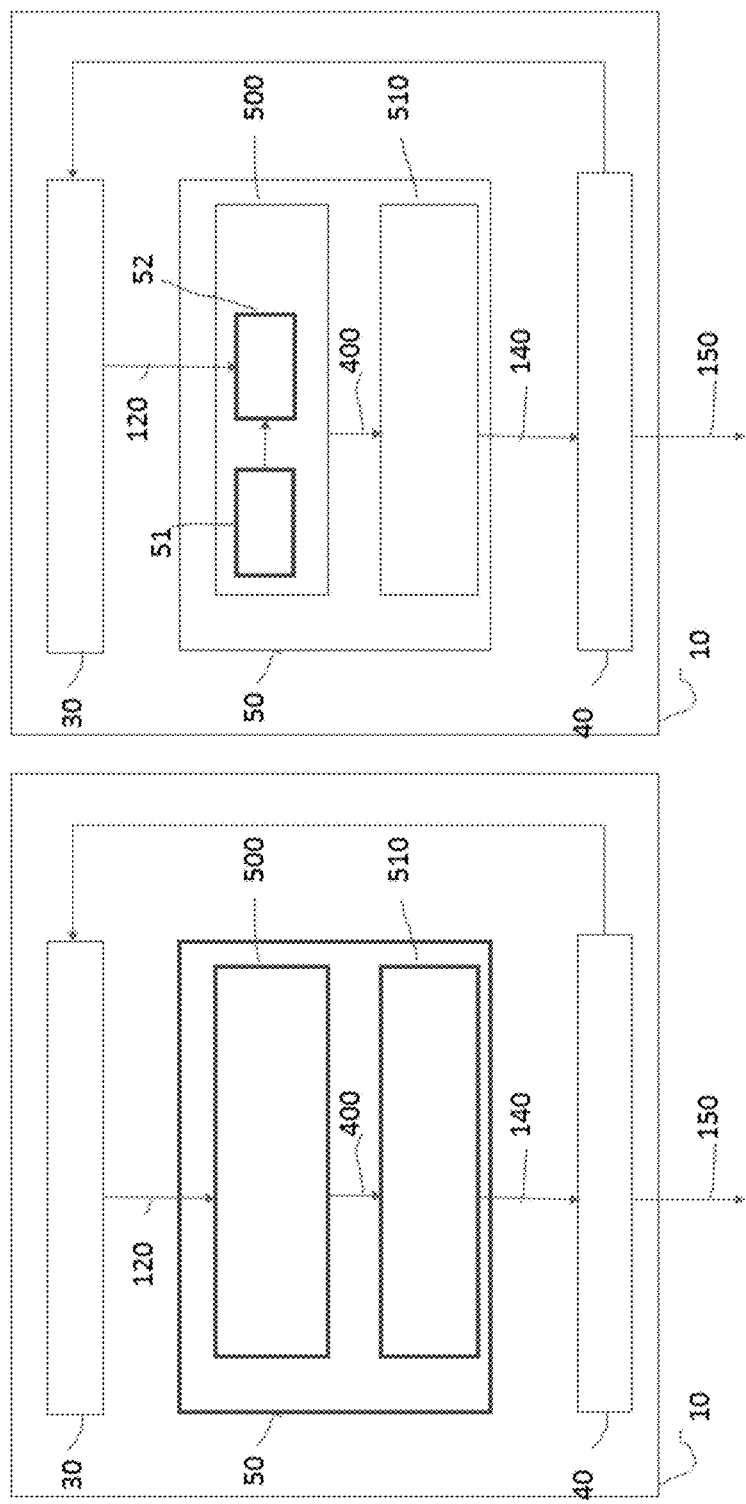
FIG. 6 shows a more detailed schematic representation of an (iterative) optimisation method (10) of or for generating one or more structures, comprising sub-steps. In relation to the preferred embodiment mentioned under FIG. 3, it is worth noting that block (51) is actually fed with the chemical info (not explicitly shown).

FIG. 6 shows a schematic representation of an (iterative) optimisation method (10) of or for generating one or more structures, emphasizing that for the structural property or property, the compute step (50), comprising sub-steps of generating (500) geometry information (400) and computing (510) the property therefrom. FIG. 6 right emphasizes the embodiment wherein first Laguerre-Voronoi Tessellation is performed (51) and thereafter enrichment (52) is performed.

Figure 7:
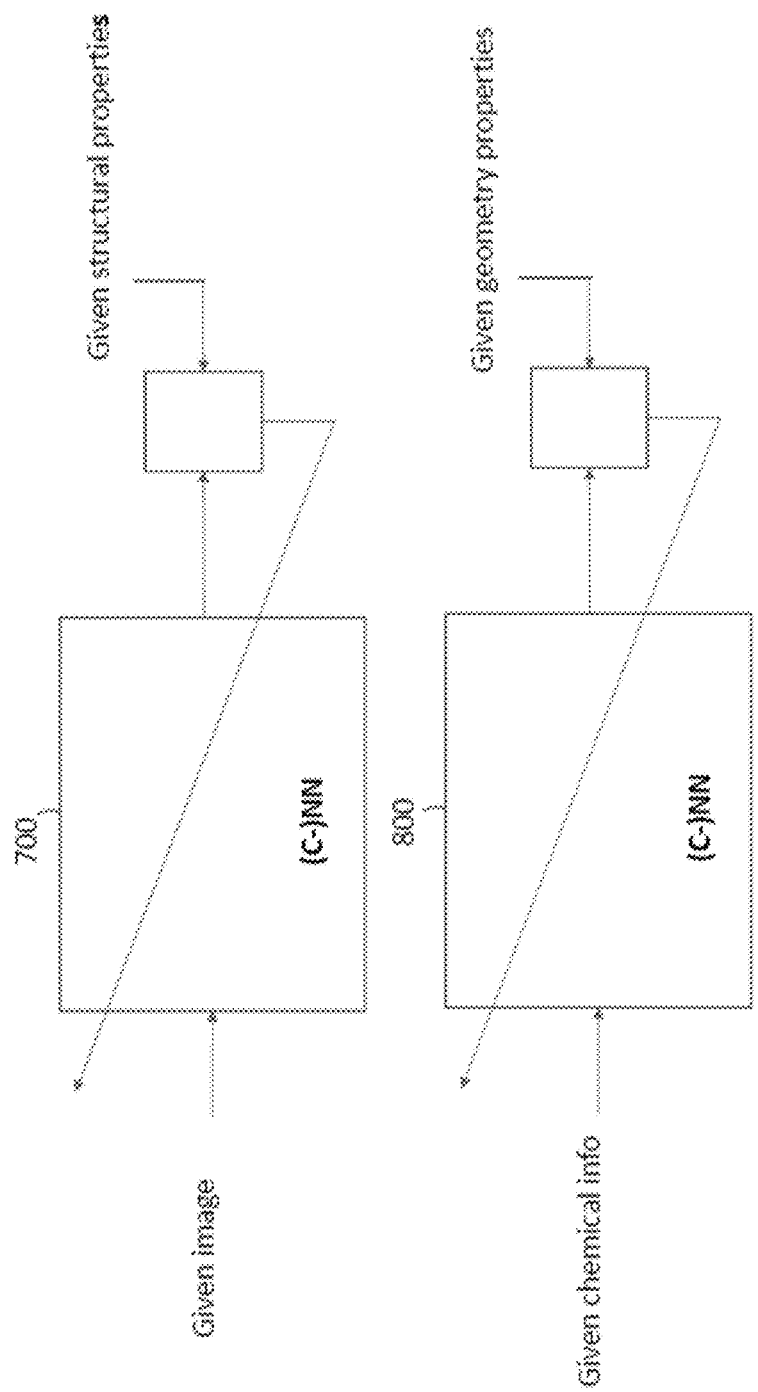
FIG. 7 illustrates the use of model training.

FIG. 7 illustrates the use of model training and schematically represents how a model, inputted with given data (either image or chemical information) and comparing with known info (structure or geometry properties) gets trained as represented by the feedback arrow, indicating the adaptation of the model parameters, for instance weights of a convolutional neural network. It is worth emphasizing that in a preferred embodiment of the invention at least two such trainings are done and used for transfer learning from this info into the optimisation method, in particular to address the structural parameter aspect. It is worth mentioning that for each of the properties discussed a separate model can be trained (700, 800). It is also worth indicating that two separate models are likely to be used for linking chemical information to geometry generating information on the one hand and chemical information to enrichment information (to be added on the generated image) on the other hand.

Figure 8:
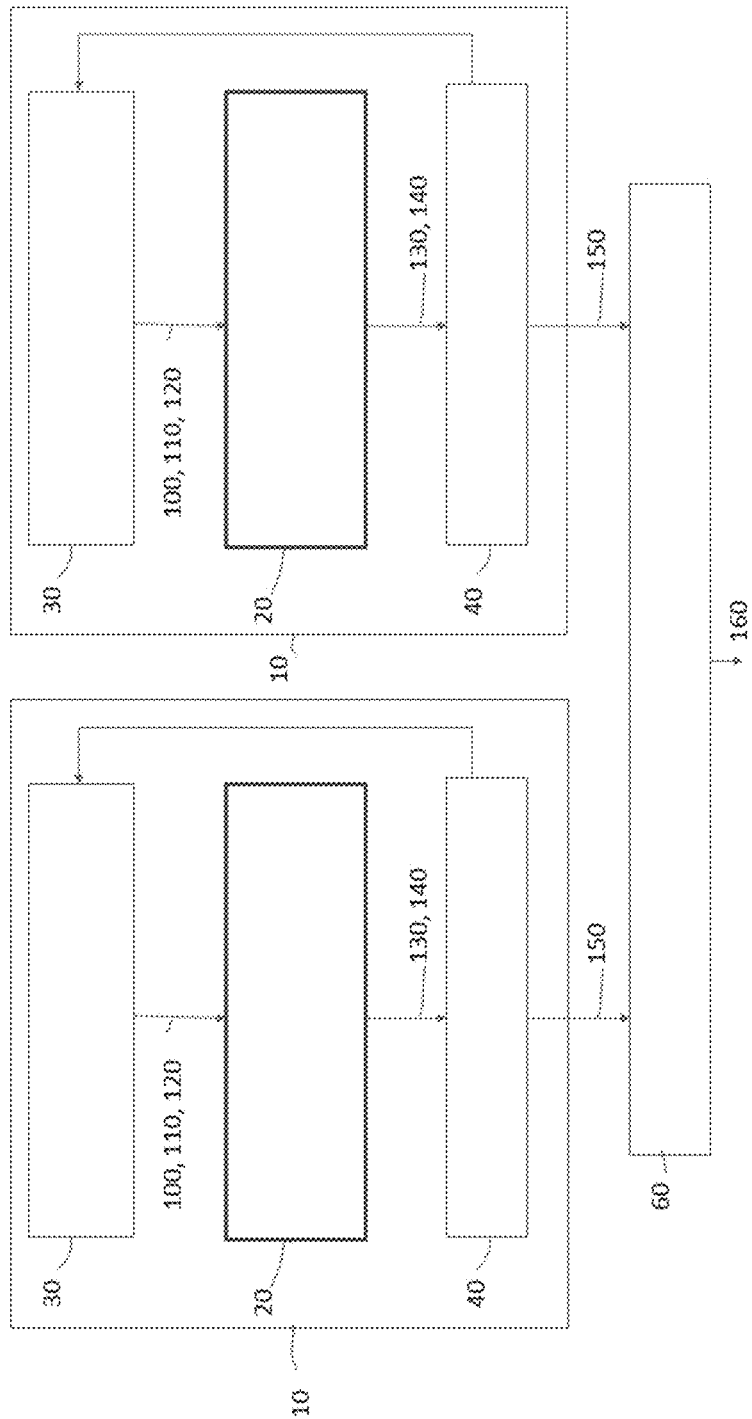
FIG. 8 illustrates a possible embodiment of the invention suitable for the layered structure of FIG. 5.

FIG. 8 illustrates a possible embodiment of the invention suitable for the layered structure of FIG. 5, wherein the optimisation method is executed per layer (left for layer 1, right for layer 2) and wherein a final joined evaluation (60) is made to determine the final structure (160). An iteration loop across the dual evaluation is also possible (not shown). The embodiments of multiple properties of same or different kind of FIGS. 2, 3, 4 and 6 can be used here per layer also. The evaluation criteria to be used for each layer might be different, for instance the use of another weight factor per property depending on the layer. The selection for layer 1 might also be determined first and taken into account for layer 2 given the dependency resulting from the passed through radiation and/or the secondary radiation it might generate.

Figure 9:
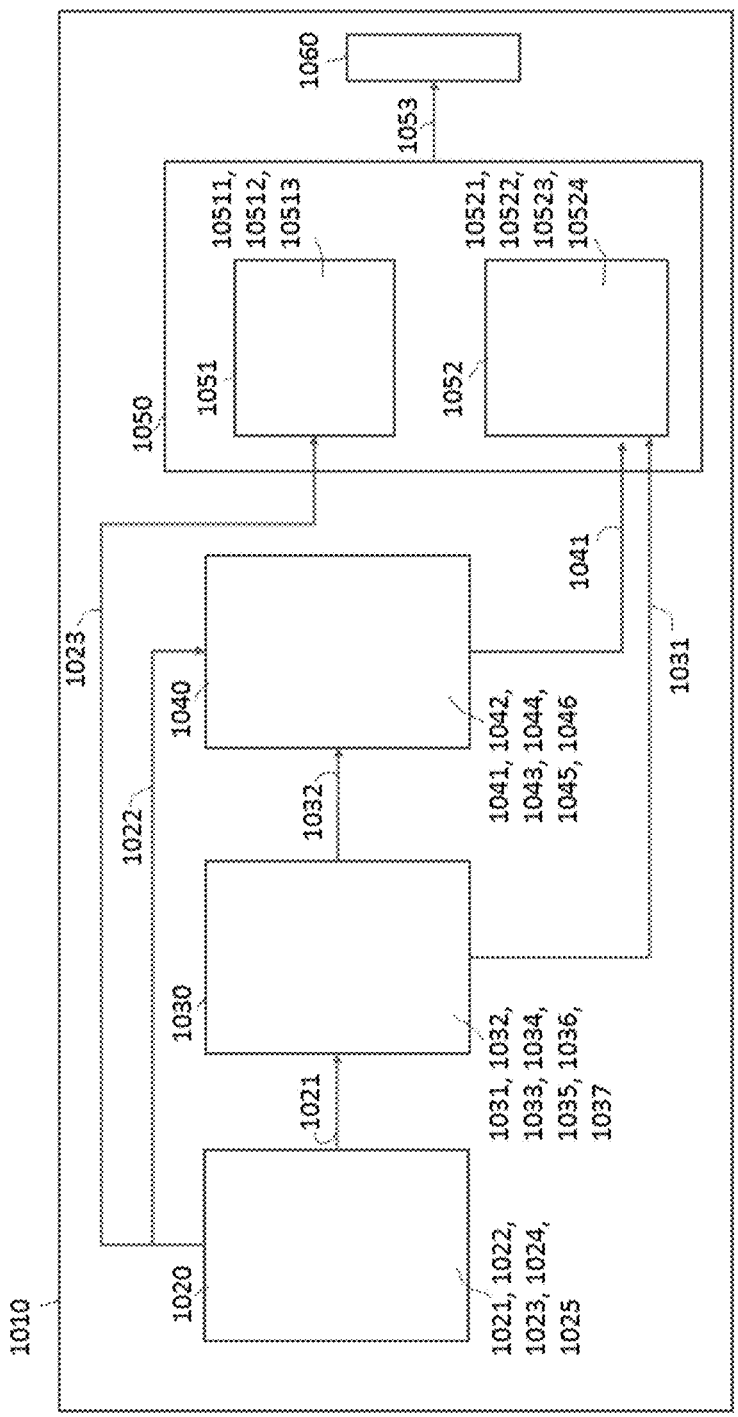
FIG. 9 provides a first-order representation of the full material system (1010) of effective radiation shielding materials with relevant mechanical properties extremely suited (but not limited thereto) for the design of spacecraft structure component, whereto the invention contributes.

FIG. 9 provides a first-order representation of the full material system (1010) of effective radiation shielding materials with relevant mechanical properties extremely suited (but not limited thereto) for the design of spacecraft structure component. The figure denotes the structural subsystems (1030) controlling the properties of interest (1050) (physical and mechanical, 1051, 1052), the sub-stages of material processing (1040), the initial and finally selected composition (1020) governing the evolution of each subsystem and resulting (1053) in the material performance (1060). The physical properties sub-system (1051) comprises the total nuclear fragmentation cross-section (10511), the stopping power (10512) and the volume density (10513). The mechanical properties sub-system (1052) comprises the specific strength (10521), the specific modulus (10522), fracture toughness (10523) and fatigue crack (10524). The composition sub-system (1020) comprises atoms (1021), molecules (1022) and, for example, molecular clusters (1023), complex ions (1024) and nanoparticles (1025). The structure sub-system comprises phases/grains (1031), phase/grain boundaries (1032), dislocations (1033), micro-cracks (1034), the microstructure (1036) and the layers (1037). The process sub-system (1040) comprises processing steps such as melting, casting, extrusion, moulding etc. (1041), powder sintering (1042), heat treatment (1043), shaping/forming (1044), solidification (1045) and mechanical processing (1046). The processing sub-system is as large as to encompass all processing methods in use for the structural engineering materials described in the invention. This representation of the full system illustrates the key linkages: composition-structure (1021), composition property (1023), composition-process (1022), process-property (1041) and structure-property (1031) and process-structure (1032) links) that have been qualified and quantified by the invention (represented by flow charts connectors). The hierarchy of the material subsystems and their linkages serve as a basis for the invention computational model and computation engine.

Figure 10:
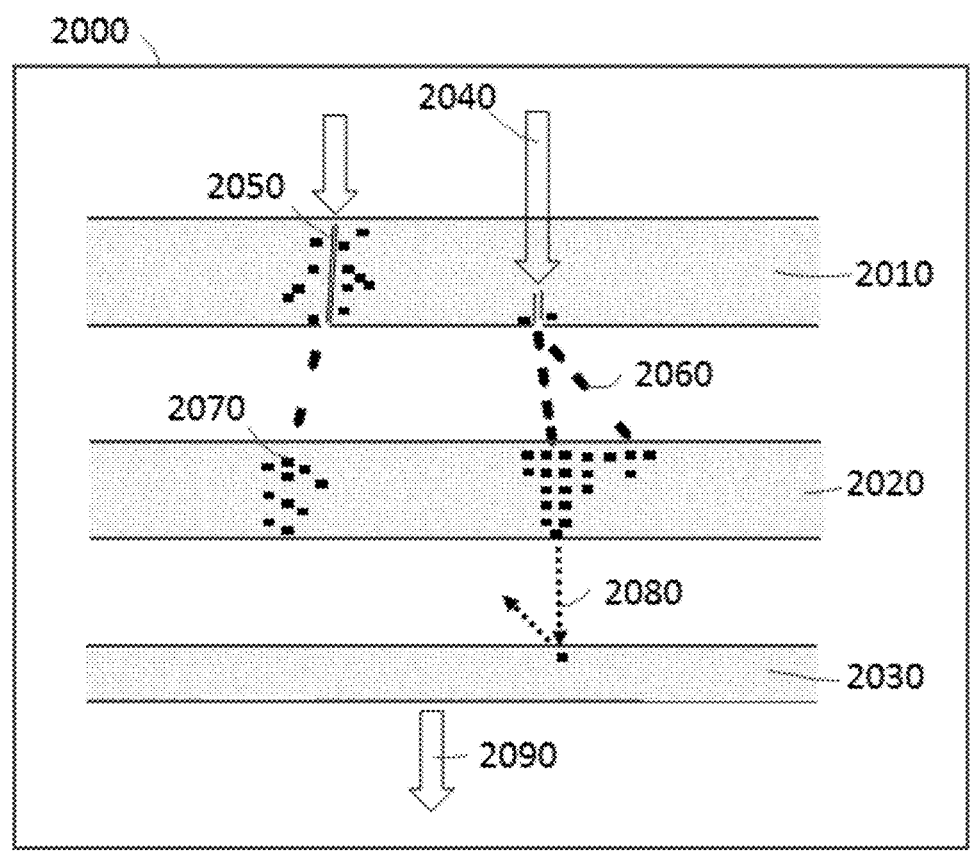
FIG. 10 provides a 3-layers (2010, 2020 and 2030) structure (2000) with spaced apart layers, to be determined by the method discussed in FIGS. 1 to 4.

FIG. 10 provides a 3-layers (2010, 2020 and 2030) approach with a structure (2000) with spaced apart layers, to be determined by the method discussed in FIGS. 1 to 4, wherein the incident radiation (High Charge High Energy Particles Primary Radiation) (2040) interaction with layer 1 (Homo-disperse microstructure optimised for total nuclear fragmentation cross-section shielding property (2010) is shown, including the fragmentation of heavier nuclei particles and the radiation physical track in the material (2050), the passed through nuclear fragments (2060), the deposited energy (2070) within layer 2 (homo-disperse microstructure optimised for stopping power shielding parameter) (2020), the (ultimate) secondary radiation (2080), which might get generated in layer 2 (2020) and finally the resulting radiation (2090) if any, which defined the dose experienced by humans, animals and/or equipment relying on the shield.

Figure 11:
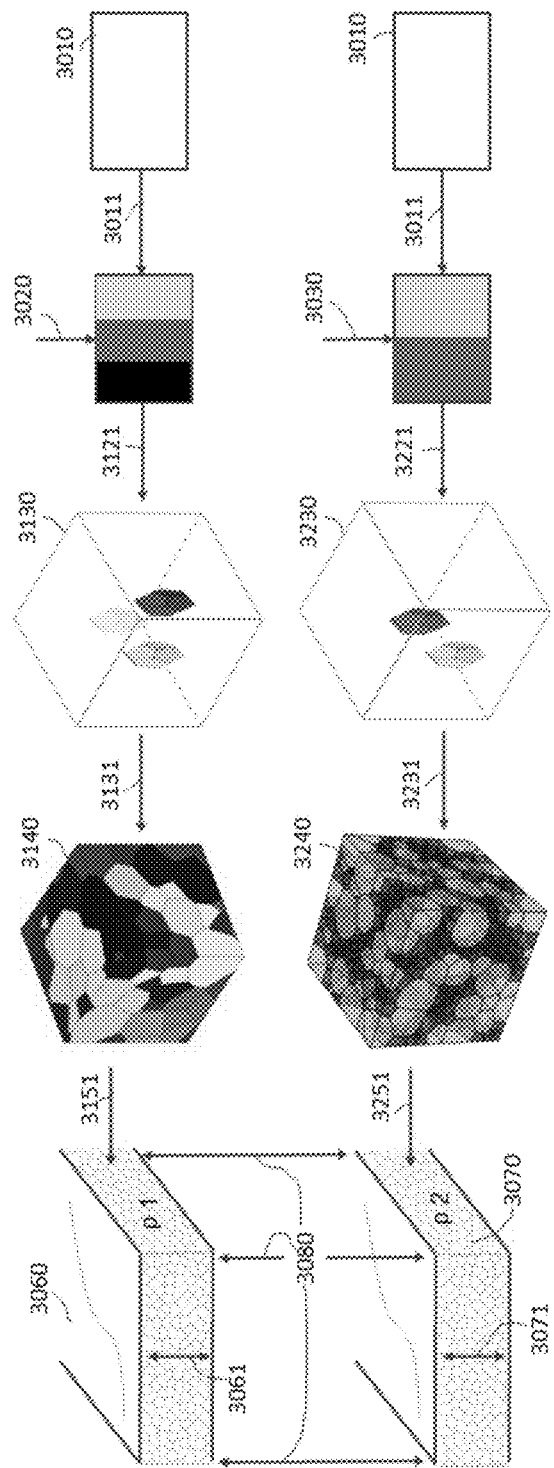
FIG. 11 illustrates the hierarchy of the different structures of the invention and their relationship to the chemical domain.

FIG. 11 illustrates the hierarchy of the different material structures of the invention and their relationship to the chemical domain. The chemical domain (3010) is mapped into empty shells (3011). Random empty shells are created based on the selected input material type, for example a 3-phases material (3020) or a 2-phases (3030) material. Taking the material type as input, a cube with finite side lengths is created as representative volume element (3121). The cube contains the basic phase data (3130, 3230) and the empty cells are propagated (3131, 3231) to fill the cube using the material geometric features known from the transfer learning model. The microstructures (3140, 3240) contain the finally selected composition for the selected material. Each layer (3060, 3070) is made from different microstructures geometries and composition (3140, 3240) based on the engineering requirements. Each layer has given thickness (3061, 3071) that can be optimized based on the layers volumetric density (p 1 and p 2) calculated from the final chemical composition. The distance between layers (3080) is either fixed as per engineering requirements or can be optimized for radiation shielding efficiency.

Figure 12:
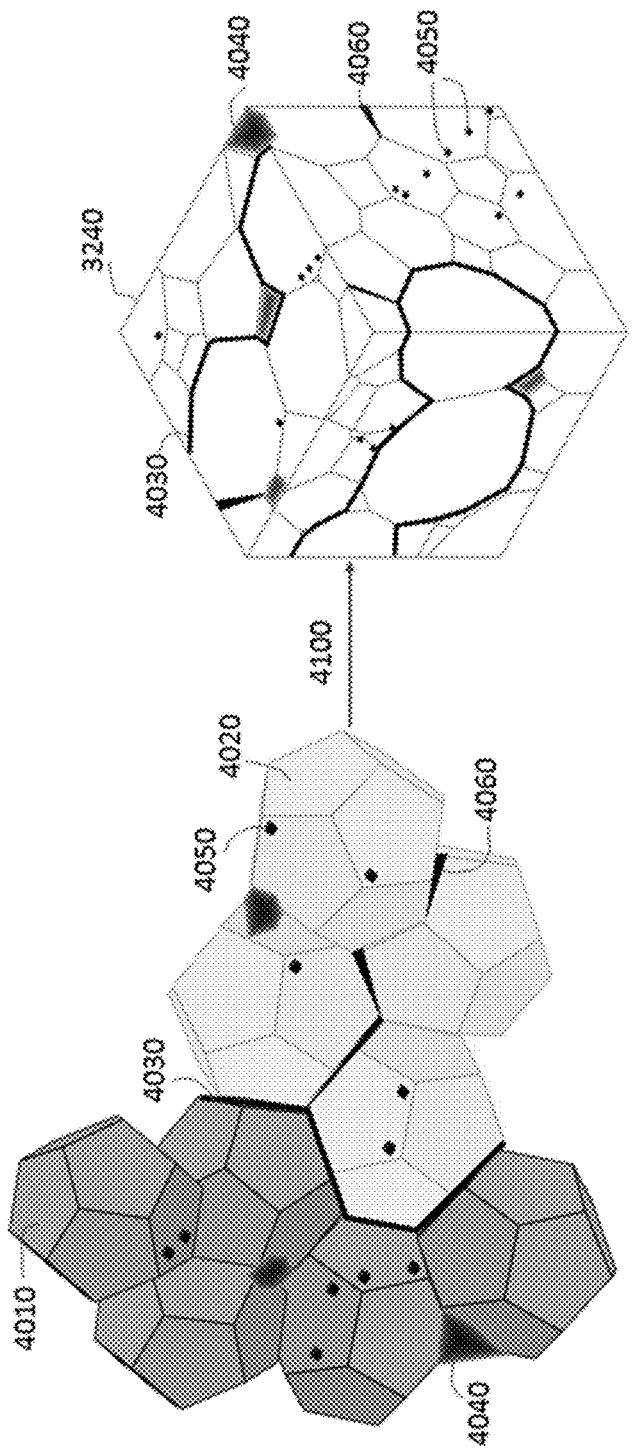
FIG. 12 provides a visual representation of the microstructure (3240) geometric features (4030, 4040, 4050, and 4060) that have been transferred from the learning model for the selected type of material (1010, 4020) to a new material microstructure mechanical properties optimisation.

FIG. 12 provides a visual representation of the microstructure (3240) geometric features (4030, 4040, 4050, and 4060) that have been transferred from the learning model for the selected type of material (for example a 2 phase material) (4010, 4020) to a new material microstructure mechanical properties optimisation. The figure provides a simplified representation of the following hierarchical microstructure geometric features: grains (4010, 4020), grain boundaries (4030), dislocations (4050), precipitates (or impurities) (4040) and micro-cracks (4060). The said microstructure geometric features are propagated (4100) to a Laguerre tessellation contained in the cube (3240), and will serve as the basis of predictors modelling in view of the mechanical properties optimisation.

Figure 13:
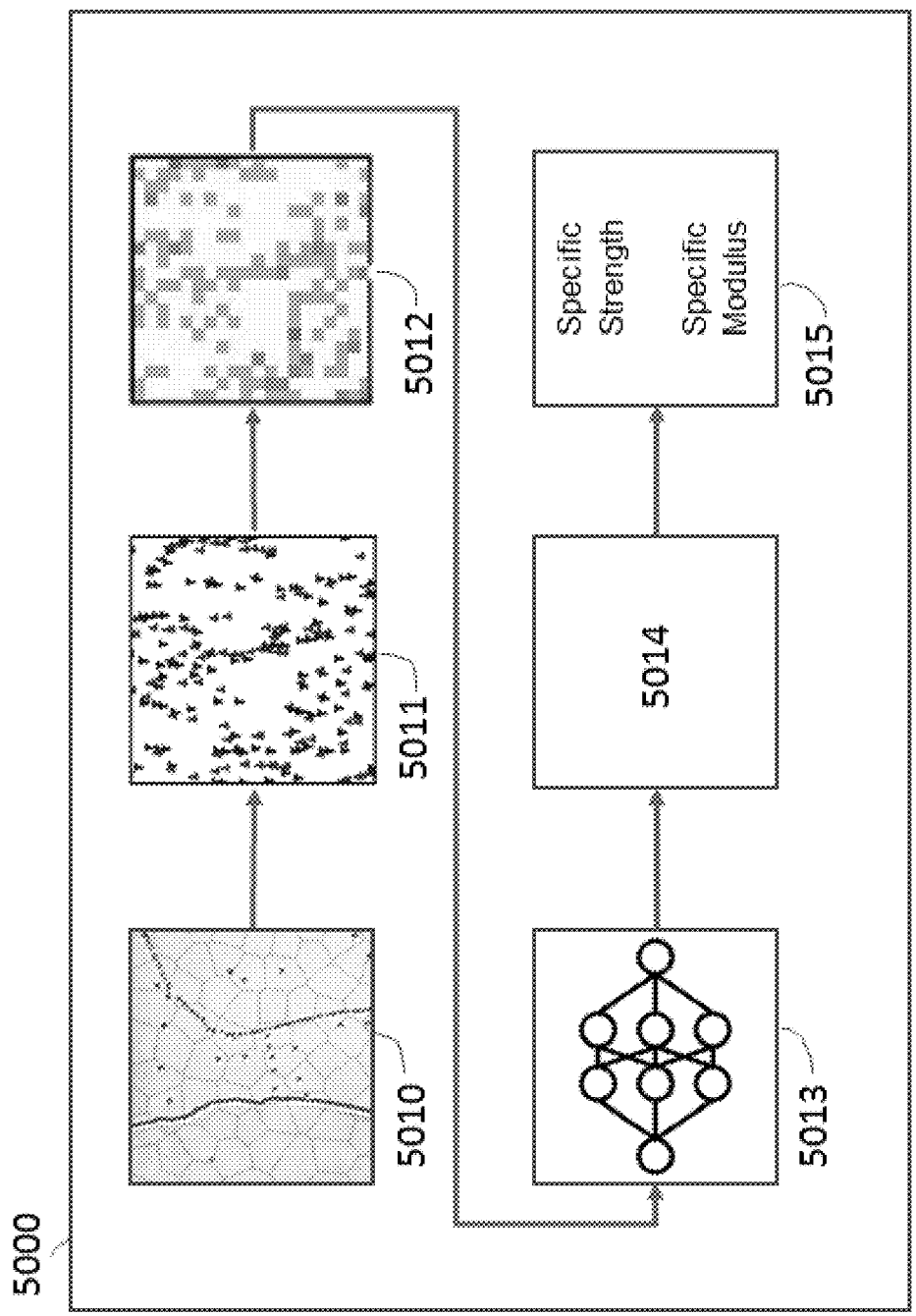
FIG. 13 illustrates the machine learning model (5000) to realise strength-related prediction using the method described in the invention.

FIG. 13 illustrates the machine learning model (5000) to realise strength-related prediction using the method described in the invention. Using direct observation of dislocations from the transfer learning approach and using a chemically optimized (radiation shielding optimized) microstructure composition (5010), the model uses Burgers vectors to represent the initial dislocation configuration (5011). The density of geometrically necessary dislocations can be extrapolated (5012), prior to feed the deep convolutional network (5013) to infer the relation between features of the initial dislocation configurations and the ensuing stress-strain curves (5014, vertical axis: stress; horizontal axis: strain). Using the stress-strain curves, the specific strength and specific modulus (5105) can be deducted by simple calculations.

Figure 14:
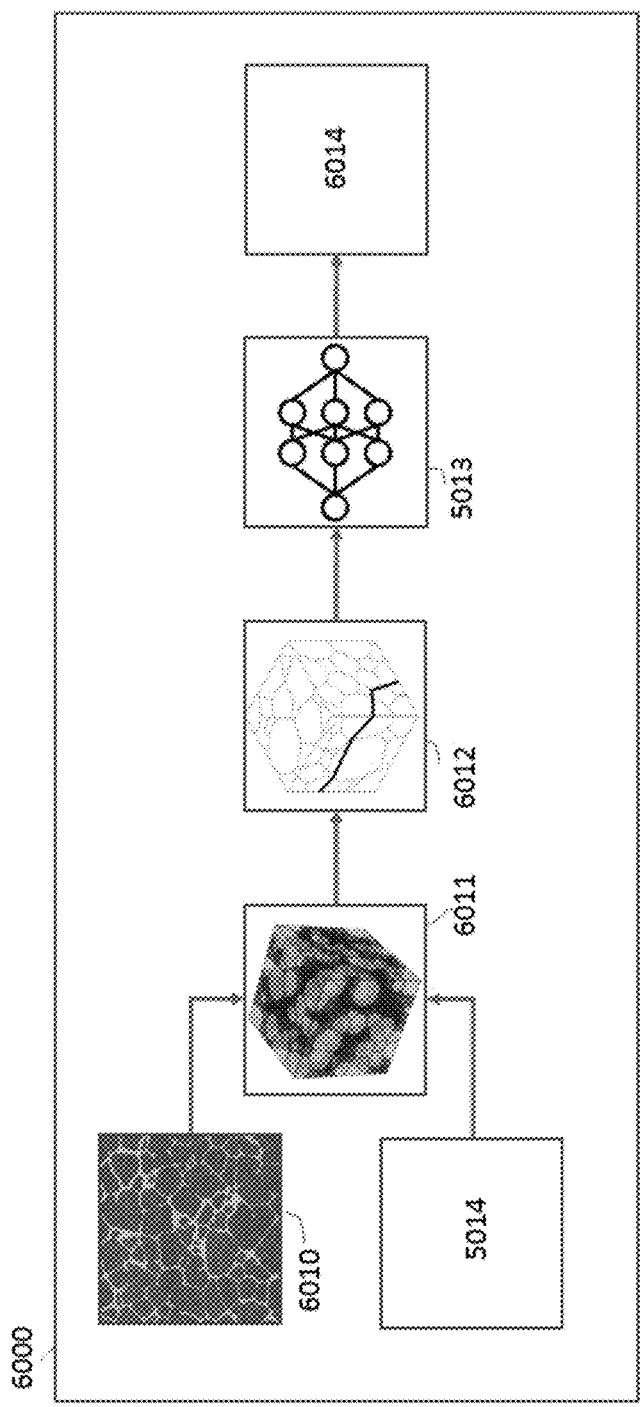
FIG. 14 provides an illustration of the machine learning model (6000) for fracture toughness behaviour prediction using the invention's method.

FIG. 14 provides an illustration of the machine learning model (6000) for fracture toughness behaviour prediction using the invention's method. Starting from actual materials characterization images from the transfer learning approach and using a chemically optimized (radiation shielding optimized) microstructure 2-phases composition (6010), the model takes the stress-strain curve data (5014) from strength-related prediction model (5000) to model spatial distribution (6011) of phase-1 grains and phase-2 grains (distribution of phase-1/phase-2) grain sizes into the representative volume element. The method uses a sub-model of microscopic fracture initiation process across the microstructure. Projected micro-crack (refer to 4060) formation in phase-1 grain are propagated into phase-2 grain and across grain boundaries (refer to 4030), within the cube model (6012). The fed deep convolutional network (5013) infers the R-curve (6014) for damage tolerant material where the stress intensity (6014, vertical axis) to propagate a crack, rises as the crack extends (6014, horizontal axis) into the material. Values of interest are taken directly from the R-curve (6014) without additional calculations.

Figure 15:
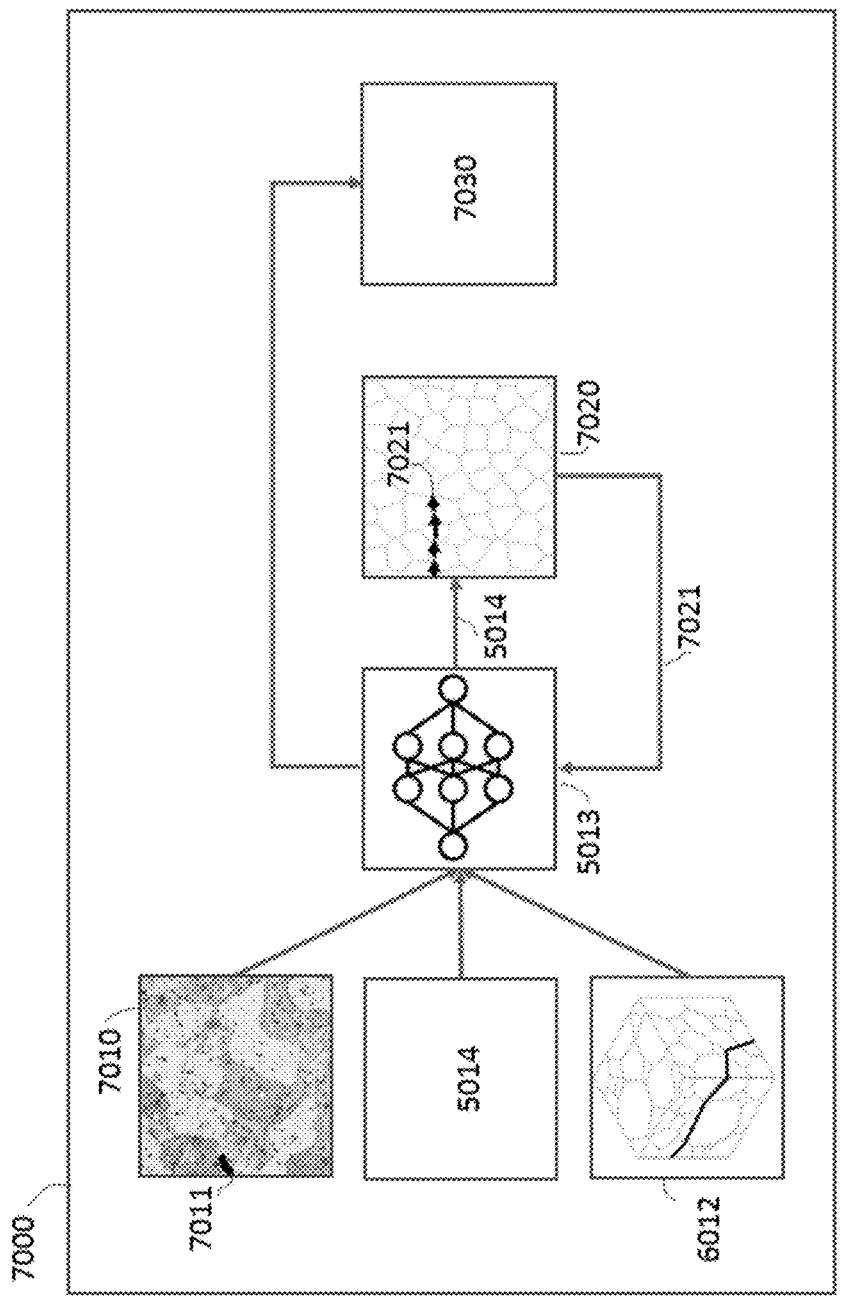
FIG. 15 shows the machine learning model (7000) for fatigue crack prediction using the invention's method.

FIG. 15 shows the machine learning model (7000) for fatigue crack prediction using the invention's method. Starting from actual materials characterization images from the transfer learning approach and using a chemically optimized (radiation shielding optimized) microstructure 2-phases composition (7010), the model takes the initial geometry with initial crack (7011) as input together with a crack-propagation model (6012). The deep convolutional network (5013) uses the learned physical meaning from relations between fracture patterns and geometries to predict (5014) a temporary output of the next crack (7020). The temporary input (7020) re-inputs as new geometry in the deep convolutional network (5013), until a final output (7021) is reached (when specific crack ends conditions are met) and fracture patterns (over time) are predicted. Fatigue crack growth rate for the material of interest can be plotted (7030) (here on a log-log plot) with respect to the stress intensity factor range (5014).

Figure 16:
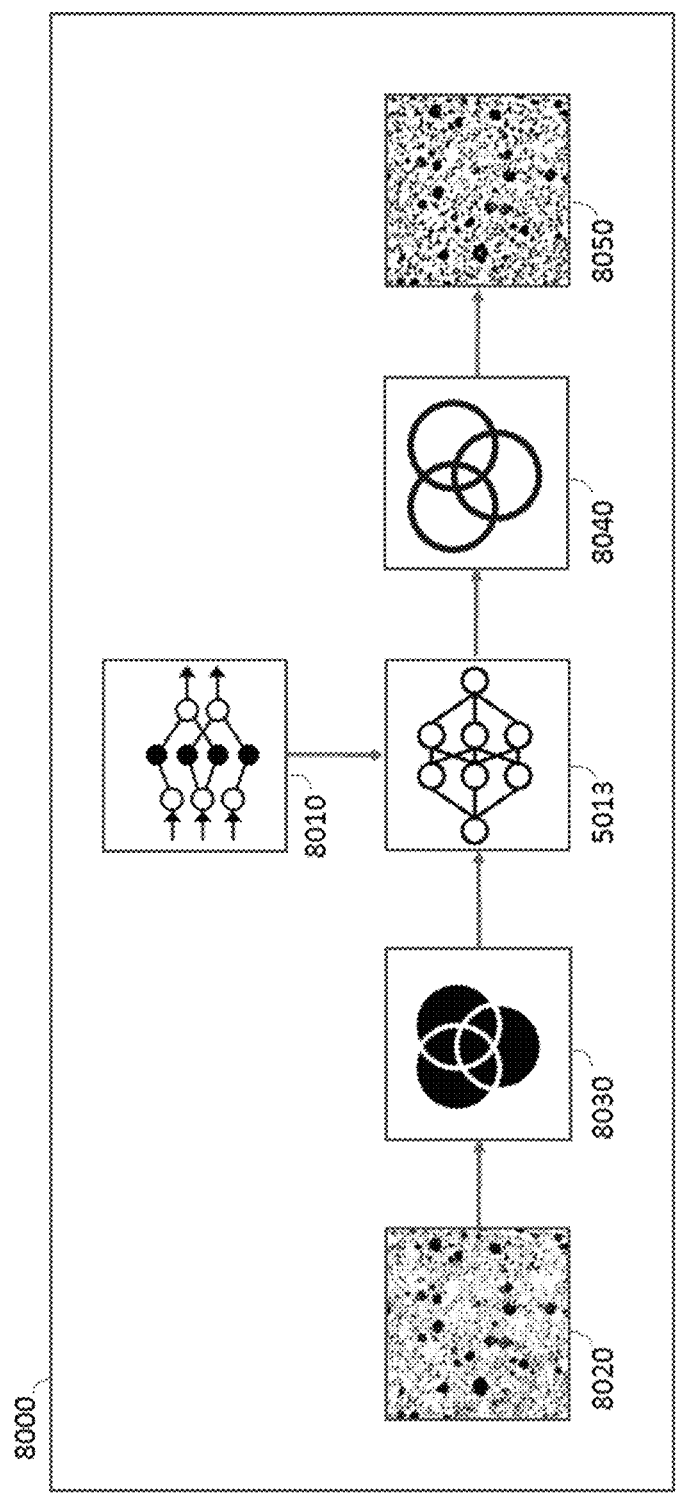
FIG. 16 shows how the machine learning model has been created (8010) and how material microstructures are reconstructed (8020, 8050) using encoding-decoding steps (8030, 8040) in combination with the transferred learning model (5013).

FIG. 16 represents the transfer-learning model (8000) used in the method. The deep convolutional neural network model is initially pre-trained on auxiliary datasets (8010) using image characterization of materials or initially even non-materials. For a material of interest to be optimised, the input original microstructure (8020) (or a generic input microstructure when researching new materials) is first passed through an encoding process (8030) to obtain an n-channel representation, for example 3-channel representation using RGB standard. Simultaneously, the initial n-channel representation of the reconstructed microstructure is randomly generated as the initialization. In each iteration of the reconstruction process, both of the n-channel representations of the original and reconstructed microstructures are fed into the transferred pre-trained deep convolutional network (5013), and a loss function is utilized to measure the statistical difference between the original and the reconstructed microstructures. The gradient of the loss function with respect to each pixel (8040) of the reconstructed microstructure is computed via back-propagation and is then utilized in gradient-based optimisation to update the reconstructed microstructure. Finally, the updated 3-channel representation of the reconstructed microstructure is propagated through a decoding stage via unsupervised learning to obtain the reconstructed microstructure (8050).

Figure 17:
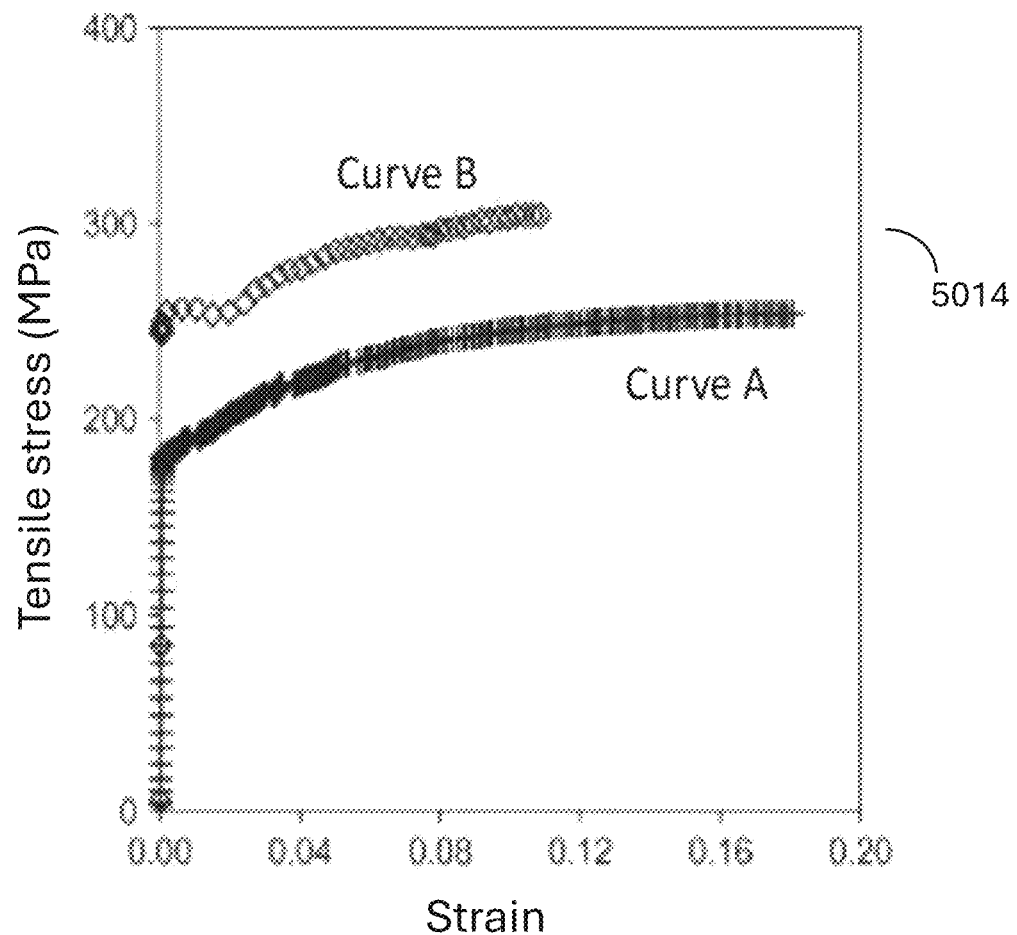
FIG. 17 provides a detailed view of the ensuing stress-strain curves (5014) corresponding to the machine learning model (5000) illustrated on FIG. 13, the machine learning model (6000) shown in FIG. 14 and the machine learning model (7000) shown in FIG. 15.

FIG. 17 shows a detailed view of the ensuing stress-strain curves (5014) corresponding to the machine learning model (5000) illustrated on FIG. 13, the machine learning model (6000) shown in FIG. 14 and the machine learning model (7000) shown in FIG. 15. The vertical axis represents the tensile strength (expressed in MPa) while the horizontal axis represents the strain (a unitless dimension representing the change in length over the original sample length). The curve "A" shows a predicted stress-strain curve for an un-deformed sample of AISI 1008 steel alloy; the curve "B": shows a predicted stress-strain curve for cold worked of the same alloy. The cold worked alloys shows a higher predicted tensile strength due to the smaller number of voids at the grain boundaries within the microstructure.

Figure 18:
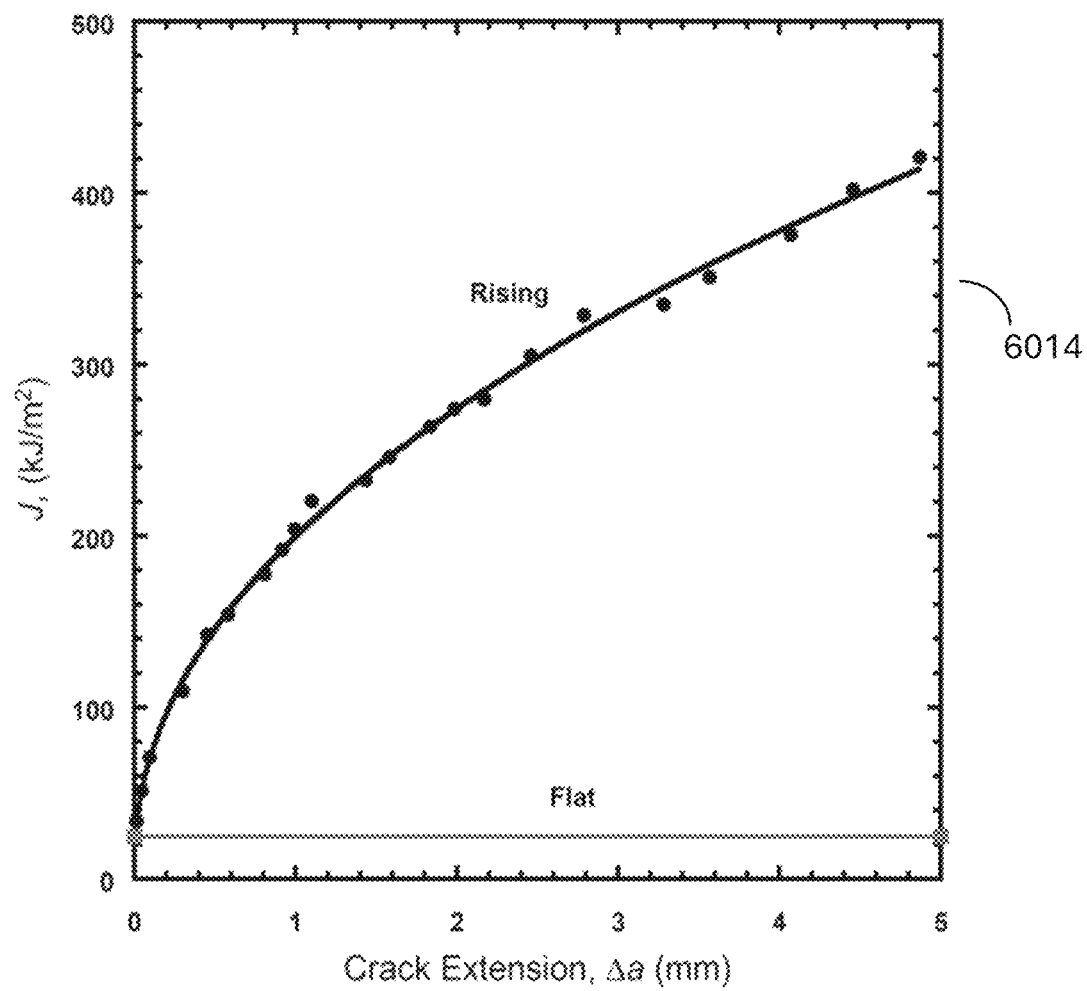
FIG. 18 illustrates a detailed view of the R-curve (6014) corresponding to the machine learning model (6000) shown in FIG. 14.

FIG. 18 illustrates a detailed view of the R-curve (6014) corresponding to the machine learning model (6000) shown in FIG. 14. The vertical axis represents the fracture toughness "J" of the material (expressed in kilo Joules per $m^2$) while the horizontal axis represents the progressive crack extension "delta a" (expressed in mm). The plotted curve shows the predicted tearing resistance curve, or R-curve of a damage tolerant ceramic material.

Figure 19:
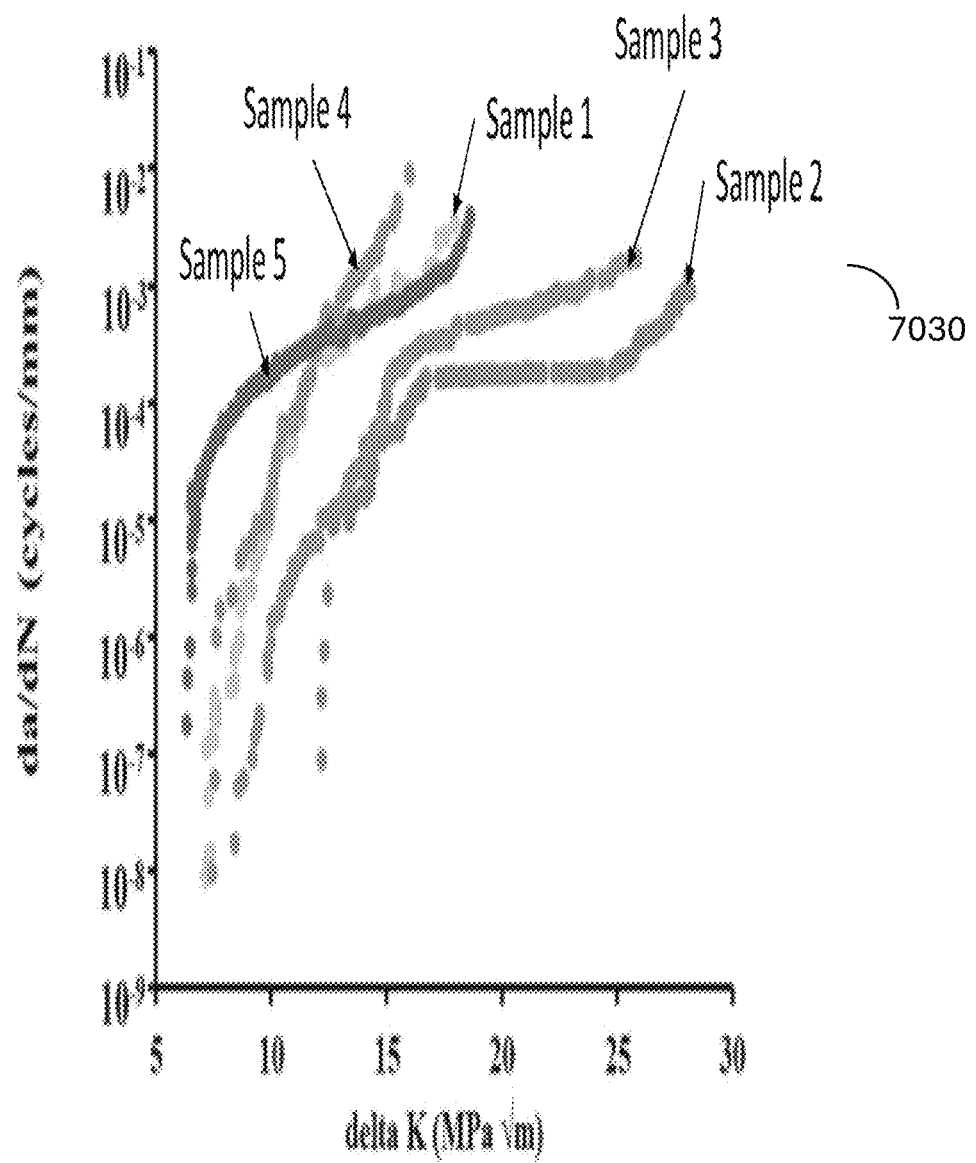
FIG. 19 shows a detailed view of the fatigue crack growth rate (7030) correspond the machine learning model (6000) illustrated on FIG. 15.

FIG. 19 shows a detailed view of the fatigue crack growth rate (7030) correspond the machine learning model (6000) illustrated on FIG. 15. The vertical axis represents fatigue crack growth rate (da/dN) (expressed in #cycles per mm of crack growth) while the horizontal axis represents the stress intensity factor range ΔK (expressed in MPa per $m^{-1/2}$). The plotted (on log-log plot) set of data points represents prediction experiments on aluminium Al 2014 alloy. The material samples were simulated for cold rolling at room temperature, 100° C., 150° C., 200° C. and 250° C. which are termed as sample 1, sample 2, sample 3, sample 4 and sample 5 respectively.

Figure 20:
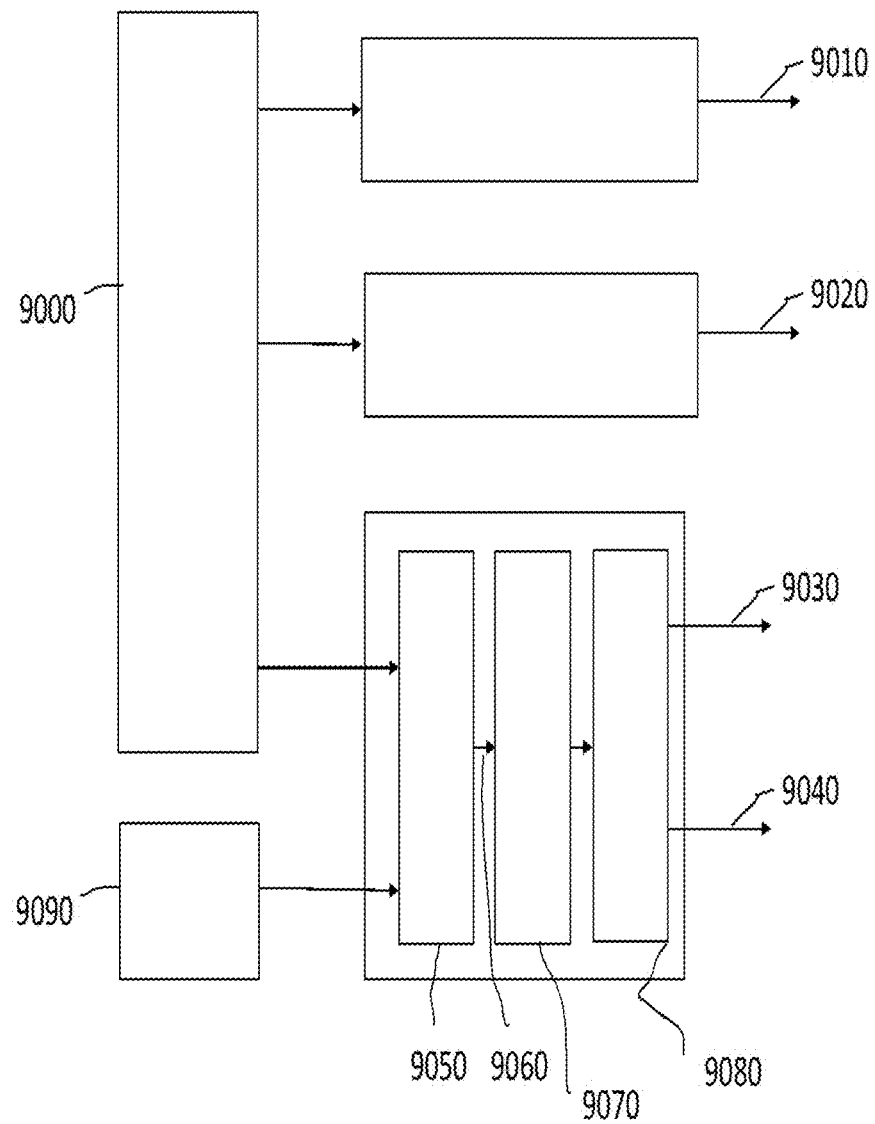
FIG. 20 shows a schematic representation of the used computation model for the objectives or properties, showing the direct use of chemical information (9000) for the computation of two radiation shielding properties (9010, 9020) and the indirect use of chemical information in combination with material processing parameters (9090) for the computation of two structural or mechanical properties (9030, 9040).

FIG. 20 shows a schematic representation of the used computation model for the objectives or properties, showing the direct use of chemical information (9000) for the computation of two radiation shielding properties (9010, 9020) and the indirect use of chemical information in combination with material processing parameters (9090) for the computation of two structural or mechanical properties (9030, 9040), wherein first via a machine learned model (9050) geometry generating information (9060) is determined, then performing Laguerre-Voronoi Tessellation step (9070) based thereon to generate a synthetic image and then used of a machine learned model (9080) to finally compute the two structural or mechanical properties (9030, 9040).

Figure 21:
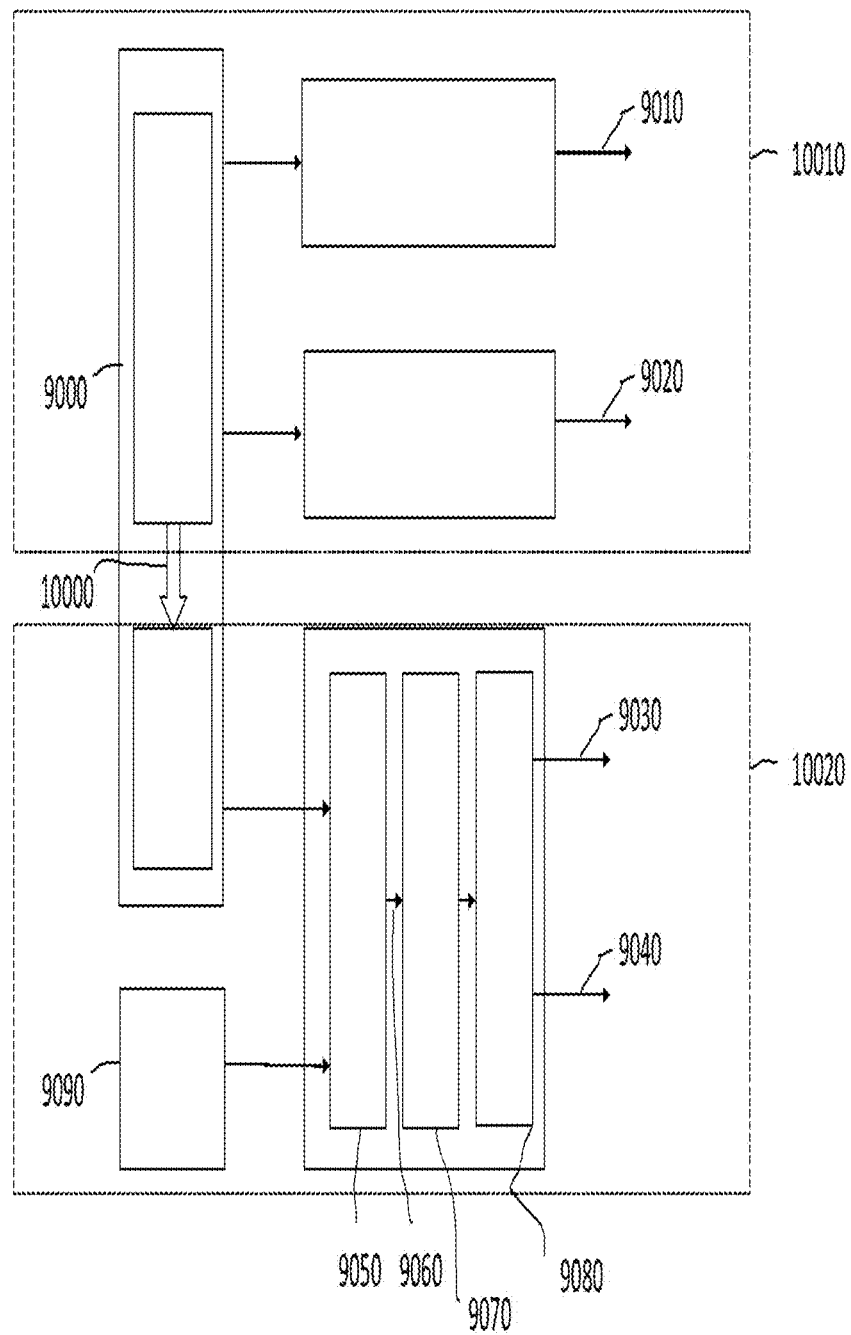
FIG. 21 shows a search method performing an optimisation method (10010) to obtain a solution space (10000) of chemical compositions and performing the optimisation method (10020) for structural properties.

FIG. 21 shows a search method, carried out by a computer, for determining one or more materials (150), by outputting their selected chemical composition and material processing steps, based on the computation model of FIG. 17, these being selected by an optimisation method, the method comprising: (1) performing an optimisation method (10010) to obtain a solution space (10000) of chemical compositions with desirable radiation shielding parameters; and thereafter within the solution space defined by step (1), (2) performing the optimisation method (10020) comprising: (i) computing one or more structural properties and including those computed structural properties as objectives.

Figure 22:
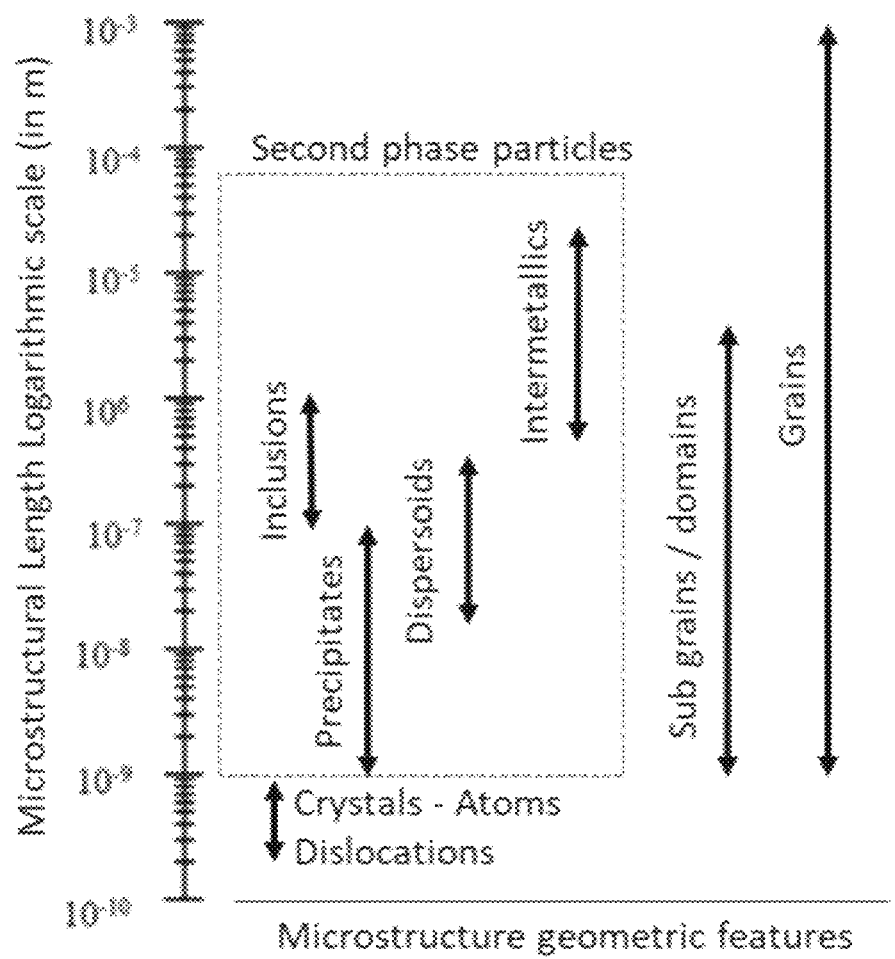
FIG. 22 shows the indicative spatial hierarchy of microstructure. The vertical axis represents a microstructural length logarithmic scale (expressed in meters). The horizontal axis (which is dimensionless) represents the range of microstructure geometric features, starting from the smallest scale constituents (atoms) to the largest microstructure building blocks (the grains).

FIG. 22 shows the indicative spatial hierarchy of microstructure. The vertical axis represents a microstructural length logarithmic scale (expressed in meters). The horizontal axis (which is dimensionless) represents the range of microstructure geometric features, starting from the smallest scale constituents (atoms) to the largest microstructure building blocks (the grains).

The invention is now further described in more detail.

It is to be understood that methods for computing and optimizing radiation shielding properties of a material are based on information about the chemical composition (such as the atoms, the amount of atoms, and information related to these atomic variables) thereof. Therefore, the present method can be phrased as a method for computing optimised radiation shielding properties of a material, comprising the steps of inputting, or loading (in the computer system storage module and memory module) the chemical composition and, computing said optimized radiation shielding properties of a material based on said inputted composition. As such physics based methods are adapted for use in global optimisation methods applied for generating or defining materials, their use is to explore (all) the chemical composition combinatorial possibilities, denoted chemical space, and an appropriate modelling format and computational discovery process is required to facilitate this. The same consideration can be made for the optimisation methods themselves that need to be properly selected, fine-tuned or redesigned form scratch for the purpose of the said materials computational discovery process. Preferably, in such large combinatorial search space, the method is implemented in such a way that the user can restrict the chemical search space by selecting subsets of atoms based on criteria such as supply availability or toxicity.

For the sake of clarity throughout the description, (i) radiation shielding properties will be referred as determined preferably by physics-based models and (ii) the notion of structural property and mechanical properties are used as alternatives for each other.

The method to compute an optimised material composition starts with the following steps:

In relation to a first aspect of the invention, the appropriate modelling format for further computational materials discovery is related to evaluating physical properties (for instance modelled as an alphanumeric string of characters as input data, based on atomic-level properties) that differs from the appropriate modelling format for evaluating mechanical properties (which are a geometric type of input). Further, pertaining to the field of materials science those properties will be denoted chemical and geometric descriptors.

In an embodiment of the invention, in relation to the physical properties and the underlying chemical space to be explored, the method comprises the steps of: (1) inputting initial data which comprise a set of chemical elements under chemical system constraints (such as further defined in the text); (2) initialization, like declaring variables of the data set and computer system, being the storage and the memory module of the used computer system. The set of chemical elements used as initial input data are the chemical elements selected from the periodic table of elements (Mendeleev table) coded as a database. For example, the user selects 49 elements from the table: such as elements with atomic number (Z)=1 to 54, minus the 5 noble gases within that said interval 1<Z<54. In this case noble gases are excluded given they are inert and do not take part in chemical reactions.

In a preferred embodiment, when one wants to discover a new material, the user can assist in selecting in the composition, chemical or search space to point the computer computational power thereto. For instance, the user can select groups/clusters of chemical elements based on the field of interest or the technological relevance and restrict the number of elements to a sizeable set. Example: (1) selecting 1<Z<18 excluding the 5 metals and 3 noble gases for new polymer search; (2) the 50 most abundant elements; (3) the metal group only, in a restricted search for alloys.

As an exemplary embodiment of a suitable modelling format, a chemical descriptor can be computed based on the chemical element most fundamental variables of interest, such as (but not restricted to) atomic weight (A), atomic number (Z), atomic radius ($r_a$), Pauling electronegativity (Chi, $\chi$), mass density ($\Sigma$), valence and electronic configuration. Preferably, the chemical descriptor is computed in order to be reduced to a string of alphanumeric characters. The reduction of the range of atomic variables into one string of character is computed by the mean of the most appropriate method for the case of interest. The case of interest may be of the form of a digitally encoded genome of atomic variables, suitable for genetic algorithms such as each of four chemical elements used in a material model is represented by a binary string of seven bits. Converting the binary to decimal, the percentage contribution to the atoms mole fraction can be calculated, and the material composition can be represented. Here, the elements of the genome can be continuous, or integer or binary numbers and have affixed length; Here it is to be noted that the descriptor value assigned to a chemical element does not per se equals to the atomic weight number. Further, the chemical descriptor does not entail any preferred computational method as it may apply to evolutionary computing and machine learning. Example: (1) a regression line is computed for atomic weight number and valence where the chemical descriptor ranges from 0 to 49 atoms, assuming one had defined a set of 49 chemical elements as input data. The 0 value is assigned to the projection of the first element on the regression line while the value 49 is assigned to the chemical element having the farthest distance of the projections from this "zero"; (2) In one particular setting of a regression line, the atomic element carbon "C" has the value 39, while its atomic number is 12.

The chemical system constraints are now further defined by:
- The number $\mathcal{N}$ of possible chemical elements in the system, such as AB is a binary chemical system made of elements A and B. Larger systems where for example $2<\mathcal{N}<8$ are preferred in the present method as they better reflect actual engineering materials. Example: for metal alloys: $7<\mathcal{N}<10$ including a system such as ABCDEFGH (eight atoms system or octonary system) or ABCDEFGHIJ (a 10 atoms systems or denary system);
- A stoichiometric system structure of the type $A_nB_m$ where the ratio n/m reflects for example, ionic and covalent bonds equilibrium;
- The range of possible molar weight ratios for elements in the chemical system, such as $A_nB_m$ is a binary system made of n atoms of A and m atoms of B and for example $1<n<100$ and $1<m<100$ such as the octonary system $A_nB_mC_kD_lE_pF_rG_q$;
- Additional system constraints can be added to account for systems that are not straightforward stoichiometric (binary system structure made of n metal atoms and m ions where the ration n/m or any ratio n/m/k/l/p/r/q respect valences) combinations, such as the molecular structure of systems, molecular aggregates, precipitates within a matrix, and other material constituents structure. Examples:
   - Composition groups with molecular structure: (Sn,Pb)(Zr,Hf,Ti)O3; (Ba,Sr,Ca)(Zr,Hf,Ti)O3 and (Li,Na,K,Rb,Cs)(Ta,Nb)O3;
   - Molecular clusters with n-monomers: a copper cluster of Cun with n=1,000 atoms;
   - Generic polymer chains of a minimal length: a carbon chain of minimum 100 atoms such as —(CH2-CH2)n- with n=100;
   - Complex ions with structures such as [Fe(H2O)6]3+; [AlF6]3-; [Co(NH3)6]2+

Specific constraints can be added regarding the stoichiometry such as limiting the ratio n/m to certain proportion, or assigning maximum values for n and m (and further stoichiometry indices) based on relevant statistical information on the most frequent stoichiometry for certain types of compounds.

In an embodiment of the invention, in relation to mechanical properties and the underlying space to be explored, the method for computing one or more mechanical properties of a material, based on information about the microscopic building blocks, also taking into account the inputted chemical information, is possible in the same way or similar way as described above, but now on the level of a microstructure. It is worth emphasizing that while the invention acknowledges that mechanical properties can be determined by geometric information, the starting method input, for instance via the chemical descriptor, belongs to the chemical domain and does not entail or require any preferred geometric domain or information.

For the purpose of computing said one or more structural properties of a material, based on information about the chemical composition the following microscopic building blocks are of primary importance: grains, sub-grains/domains, second phases, molecular aggregates, intermetallic particles, precipitates particles, dispersoids particles, inclusions, and possible contaminants.

Hence in a preferred embodiment, also in the part of the invention in relation to the mechanical properties, the method comprises also the steps of: (1) inputting initial data which comprises a set of chemical compositions; (2) initialization of the data set and computer system being the storage module and the memory module of the used computer system; (3) computing mechanical properties based on chemical information.

In a further preferred embodiment, a set of chemical compositions is defined as a collection of distinct chemical systems. Example, the set {Al, Al$_2$Cu, Al$_2$CuMg, Al$_2$CuLi, Mg$_2$Si} is a collection of distinct chemical systems representative of an aluminium alloy, such as {Al} is the main alloying phase matrix system, {Al$_2$Cu, Al$_2$CuMg} are other alloy phase systems, {Al$_2$CuLi} are intermetallics systems and {Mg$_2$Si} are precipitates systems.

The concept of chemical domain is now introduced and defined as any connected subset of a finite-dimensional vector space. Example the set {A, B, C} connects subsets A, B and C where A can be represented as $A=[a_1, a_2, a_3]$, a three dimensional vector.

The total design space of the method is defined as the design space=$E^3 \times E^k$ where $E^3$ is the Euclidian space, the space in which all structural geometric components and microstructure geometries exist, and $E^K$ is the material space where K>1, is the total number of chemical systems such as microstructure primary materials. Each engineering material type, such as metal alloys, polymers, and ceramics, belong to its own chemical domain noted Omega: $\Omega_{alloys}$, $\Omega_{polymers}$, $\Omega_{ceramics}$. Each chemical domain is included in $E^K$. Each $\{M_{Ki}\}$ is a primary material set in the chemical domain $\Omega_{Ki}$ that contains all chemical composition pertaining to that particular domain. Example: the set {Al, Al$_2$Cu, Al$_2$CuMg, Al$_2$CuLi, Mg$_2$Si} is a material (a set) made of primary materials within $\Omega_{alloys}$.

The shielding efficiency of the material is defined as the radiation dose reduction rate per unit mass density, which derives from an increased total nuclear cross-section fragmentation 6 and increased stopping power S. The higher the radiation dose reduction, the higher the shielding efficiency of the material.

Relying on the above chemical space search format requirements, the method to compute an optimised material composition continues with the subsequent steps:

The first property considered for radiation shielding optimisation is the fragmentation by the said material of high energy and high charge radiation particles (HZE particles) into smaller fragments, lighter energy particles. By definition a high charge particle will have a heavier nuclei, as the total charge derives from electrons being stripped from the atom, hence only leaving the nuclei and its constituting neutrons (neutron charge=0) and protons (proton charge=+1). Example $^{26+}$Fe is a high charge particle (charge=+26) because its atomic number is higher (26), hence exposing its full +26 charge when stripped from all of its electrons. As well, the atomic weight number being higher and the particle travelling through space at sometimes relativistic velocity, the total kinetic energy is high as well. The radiation shielding property to measure the incoming particle total nuclear cross-section fragmentation is computed by use of the Boltzmann like equations.

As the Boltzmann equation governs the total nuclear cross section reactions, and since there are no tractable numerical solving methods thereof (multi-body problem), simpler energy independent model such as the BRADT-PETERS model and its variants are used. In a preferred embodiment, the WILSON-TOWNSEND model, or an even more simplified version thereof is used, which is a slightly modified version for use in space radiation shielding problems.

As a Boltzmann equation may fail when dealing with polycrystalline materials and/or highly-correlated media and/or in the case of polycrystal whose typical grain size is comparable to the mean free path length, and given that the invention does operate on microstructures made of grains, in an embodiment, a generalized linear Boltzmann equation capturing the long-range memory effect is preferred. A key feature of such generalized equation is that the distribution of free path lengths has an exponential decay rate, as opposed to a power-law distribution observed in a single crystal.

In an embodiment of the invention the computing method could make use of different simplified models to account for non-homogeneous media.

A representative set of suitable formulas to calculate the total nuclear cross section fragmentation is given below:

$$\sigma_{cc} = \pi r_0^2 (A_{proj}^{1/3} + A_{targ}^{1/3} - 0.2 - 1/A_{proj} - 1/A_{targ}) \text{ WILSON-TOWNSEND}$$

$\sigma_{cc}$: total charge-changing cross section
$r_0$: nucleon radius
$A_{proj}$: Atomic weight of the projectile (incoming radiation)
$A_{targ}$: Atomic weight of the target material i.e. the shielding material

SIMPLIFIED WILSON–TOWNSEND $$\sigma_{mat} \propto N\sigma_{mole} \propto \frac{\rho n A_{Tave}^{2/3}}{A_T} \propto \frac{\rho A_{Tave}^{2/3}}{A_{Tave}} \propto \frac{\rho}{A_{Tave}^{1/3}}.$$

$$\frac{\sigma_{mat}}{\rho} \propto A_{Tave}^{-1/3}.$$

$\sigma_{mat}$: total nuclear fragmentation cross-section of the shielding material
N: number of molecules in the system
$\sigma_{mole}$: total fragmentation cross section of a molecule
$\rho$: shielding material density
n: total number of atoms in the molecule
$A_T$: atomic weight of the target material i.e. the shielding material
$A_{Tave}$: average atomic weight of the target material i.e. the shielding material Hence the first radiation shielding property that needs to be optimised is the total nuclear fragmentation cross-section, directly proportional to the average atomic weight of the shielding material constituting atoms.

Materials with a large value of sigma as shielding property are favoured for space radiation shielding, such that a fitness function $\mathcal{F}(\sigma)$ is to be maximised→Max$\mathcal{F}(\sigma)$ The second property considered for radiation shielding optimisation is the lateral transfer of energy from incoming radiation to the said shielding material by ionisation energy loss and the following equations can be used for computing this shielding property:

BETHE BLOCH EQUATION $$\frac{dE}{dx} = -k\rho \left(\frac{Z}{A}\right)_{mat} \left(\frac{Z}{\beta}\right)_{proj}^2 \left[\log\left(\frac{2m_e\beta^2}{I(1-\beta^2)}\right) - \beta^2\right]$$

dE/dx: the energy E lost by the incident radiation particle projectile per unit path length x
k: a constant grouping electrons characteristics $\rho$: target shielding material density
Z: atomic number for target shielding material (mat) and projectile (proj)
A: atomic weight for target shielding material (mat) and projectile (proj)
$\beta$: velocity v of the moving particle (incoming radiation) relative to the speed of light c, with $\beta$=c/v;
$m_e$: electron rest mass
I: the ionization potential of the target shielding material

SIMPLIFIED BETHE BLOCH $$S = \frac{dE}{dx} \propto NZ_T,$$

$$\frac{S}{\rho} \propto \frac{\sum N_i Z_{Ti}}{\rho} \propto \frac{Z_{Total}}{A_T},$$

S: stopping power
dE/dx: the energy E lost by the projectile per unit path length x
N: number of molecules
$Z_T$: atomic number for target material
$\rho$: target material density
$A_T$: atomic weight for target material Hence the second radiation shielding property that needs to be optimised is the stopping power, directly proportional to the atomic number of the shielding material and inversely proportional to the atomic weight of the shielding material.

Materials with a large value of stopping power "S" as shielding property are favoured for space radiation shielding, such that a fitness function L(S) is to be maximised→Max L(S).

The objective of the computation method, such as an evolutionary optimisation method, is to generate successive populations of shielding materials, with varying chemical composition, exhibiting substantial improvement in the two properties of interest S and $\sigma$;

The corresponding composite fitness function H for both shielding parameters can be written:

$$H = \mathcal{F}(\sigma) + L(S) \rightarrow \text{Max}\{\mathcal{F}(\sigma) + L(S)\}$$

Both fitness function must be normalised by the material density ($\rho$) to reflect the adequacy of a given candidate shielding material in terms of its weight optimisation. Weight optimisation is a critical cost factor when shielding materials are part of components sent into outer space, related to finding the right balance between payload launch cost and strength to weight ratio of structural materials employed.

The material density can be obtained from tabulated data, when available, otherwise is can be: (1) directly calculated from atomic variables or (2) predicted using physics informed machine learning descriptor.

In one embodiment of the invention, the direct density calculation is obtained using the mass to volume ratio of a given material:

$$\rho = \frac{\text{Molecular weight (mass)}}{\text{Unit Cell(volume)}} = \frac{\frac{NM}{N_a}}{\frac{4}{3}\pi a^3}$$

Where N: is the number of atoms in the unit cell (filling factor)
M: is the molecular weight $N_a$: is the Avogadro number a: is the atomic radius.

In a particular embodiment of the invention, the density can be indirectly calculated by using a physics informed machine learning descriptor:

The density ρ of a shielding material is a function of interatomic interactions at work, and subsequently interatomic interactions are a function of force field potentials. The force field potential $U_{i,j}$ of two atoms i,j is a function of the long range Coulomb interactions, responsible for short range interactions influencing the higher or lower density of the shielding material.

BUCKINGHAM POTENTIAL EQUATION:

$$U_{i,j}\left(r_{i,j} = \frac{q_i q_j}{4\pi\varepsilon_0 r_{i,j}} + A_{i,j}\exp\left(-\frac{r_{i,j}}{B_{i,j}}\right) - \frac{C_{i,j}}{r_{i,j}^6}\right)$$

Where (i,j) is the interatomic distance between atom i and j $q_i$, $q_j$ are the effective ionic charges of atom i and j $A_{i,j}$, $B_{i,j}$, and $C_{i,j}$ are the energy parameters of the Buckingham potentials form between i and The values of $U_{i,j}$ are highly correlated to the values of the targeted material density.

Computing a large number of Buckingham potentials using high throughput Molecular Dynamics (MD) simulations, a Machine Learning (ML) model (i.e. GBM-LASSO) can be applied to learn the shielding material density property in relation with its Buckingham potential. The ML model is a statistical learning/predicting model developed by implementing the Least Absolute Shrinkage and Selection Operator (LASSO) with a Gradient Boost Machine (GBM).

In another embodiment of the invention, candidate shielding material densities are estimated using linear regression (or logistic regression) optimisation methods implemented in a trained machine learning model.

The corresponding composite fitness function H for both shielding parameters, now taking into account the density normalisation can be re-written as:

$\mathcal{F}(\sigma) \rightarrow F(\sigma,\rho)$ and $L(S) \rightarrow L(S,\rho)$ and $H = \mathcal{F}(\sigma,\rho) + L(S,\rho) \rightarrow \text{Max}\{\mathcal{F}(\sigma,\rho) + L(S,\rho)\}$ Part of the candidate shielding material search process, it is worth emphasizing that the computation method takes the chemical composition as input, wherein a global optimisation of all possible chemical compositions to find the one with the highest shielding properties values and the lowest formation energy, for thermodynamically stable output composition, is executed on the computing system processing accelerator. Therefore the computation of the, at least, two shielding properties is companioned by a computation of a representative number for such energy stability, like the Gibbs free energy of the chemical composition of said material, via a computation thereof from the same chemical composition.

Example: the energy of system of composition $Cu_xZn_yO_z$, such as a molecular cluster of the composition $Cu_{53}Zn_{10}O_9$, can be calculated using a Potential Energy Surface (PES) approximation. Each of the algorithms generated atomic composition, would yield the energy contribution $E_i$ of an atom i to the total energy E of the candidate material as a function of its local chemical environment, namely its geometric molecular structure, including the bonds between the atoms. For a system containing M atoms the total energy E is then given as:

$$E = \sum_{i=1}^{M} E_i$$

The position of the atoms with large systems of complex composition, the PES calculation presents the same challenges as those presented for crystal structure prediction.

Hence, in one particular embodiment of the invention, the thermodynamics constraint approach is selected, where the Gibbs energy or Gibbs free energy $\Delta G_f(T)$ is critical for predicting synthesizability and stability of the candidate shielding materials at the temperature T and pressure P (standard and nonstandard conditions) of interest.

G is tabulated for only a fraction of already discovered materials, hence using the SISSO (Sure Independence Screening and Sparsifying Operator) to identify a simple and accurate descriptor to predict G at a temperature T using a Machine Learning (ML) approach is part of one embodiment of the invention.

The following machine learning informed relationship is used to calculate the Gibbs energy $\Delta G_f(T)$ $\Delta G_f(T) = \Delta H_f(298 \text{ K}) + G^\delta(T) - \Sigma_{i=1}^N \alpha_i G_i(T)$ Where $\Delta H_f$ is the formation enthalpy (at 298 Kelvin)

N is the number of elements in the chemical system $\alpha i$ is the stoichiometric weight of element i $G_i$ is the absolute Gibbs energy of element i And $G^\delta$ is the temperature- and material-dependence of the enthalpy contribution to $\Delta(T)$, that can be calculated using:

$$G^\delta_{SISSO}(T)\left[\frac{eV}{atom}\right] = \\ (-2.48*10^{-4}*\ln(V) - 8.94*10^{-5}mV^{-1})T + 0.181*\ln(T) - 0.882$$

Where V is the calculated atomic volume ($\text{Å}^3\text{atom}^{-1}$)

m is the reduced atomic mass (a.m.u)

T is the temperature (K)

In one embodiment of the invention, the global optimisation algorithm to search and finally select the candidate shielding material composition can be now written as:

Within the chemical space $E^K$

Where K>1, is the total number of chemical systems such as microstructure primary materials $\{M_k\}$ is a set of materials within the domain Om where $M_k$ with k=1, . . . , n atomic compositions and where each $M_k$ can be described by at least the $A_T$ and $Z_T$ variables σ is a function $F(\rho, A_T)$ S is a function $L(\rho, Z_T, A_T)$, The objective to maximize the total fitness function H $\text{Max}\{H = \mathcal{F}(\sigma, \rho) + L(S, \rho)\}$ under the constraint of: $\Delta G_{f,T}(M_1, \ldots, M_n) < \Delta G_{f,T}(M_1) + \ldots + \Delta G_{f,T}(M_n)$ Yielding the set $\{\mathbb{C}_{k=1}\} = \{M_1, \ldots, M_n\}$ Where $\{\mathbb{C}_{k=1}\}$ is the first set of chemically optimized system And $\{\mathbb{C}_{k=1}\}$ is the optimized HZE radiation shielding candidate material With respect to tractability requirements, the state-of-the-art has to put substantial bounds on the input space and has to make a-priori assumptions on the material, like imposing a crystal structure, of which, the invention especially acknowledges that such crystal structure aspect is not key for the modelling of structural or mechanical properties (handled further).

The invention, on the contrary, has a major differentiator (apart from the radiation shielding itself) that does not bound the initial data set in this way. The invented method selects a smaller number of chemical elements (based on target material microstructure) but considers systems where the size N matches real world structural materials such as metal alloys, and for stoichiometry that match real-world molecular clusters and aggregates.

By discarding the crystal space group combinatorial the present method reduces the number of iterations by a factor 100 (alleviating the 230 possible crystallographic space groups), and allow a larger set of crystal-free chemical combinations to be tested. As said the invented method does not calculate fully relaxed energies at first, as the starting point is not the crystal lattice but the chemical composition. Knowing that real world microstructures are not thermodynamically stable (note that often it is not the most stable phase that is most interesting, but a metastable phase with special properties), the method calculates the energies using realistic approximation that do not require exceedingly large amount of computing power.

With the computation methods components defined above, the systematic search for suitable materials in terms of the plurality of properties taking into consideration the energy aspect, and this while using an appropriate input format, can be defined as a method of generating (defining) chemical compositions of one or more materials, being based on an multi-objective optimisation method, including as objectives both the fragmentation by a material of heavy nuclei high energy particles (HZE) particles into lighter energy particles (determined by the method described) and the transfer of energy from radiation to a structure by ionisation (determined by the methods described), preferably the method being based on evolutionary computation or optimisation algorithms such as genetic algorithms, as said preferably further taking into account (as constraint or as objective) the Gibbs free energy of the chemical compositions of said materials (also via a computation thereof via an approximation approach based on trained learning models).

Generally expressed, the invention is targeting realistic, hence complex chemical systems, hence being adapted for exploring chemical compositions of more than 2 different type of atoms. In one embodiment of the invention, the search for optimal composition is realised by the mean of evolutionary computation.

The initial population of individuals (materials) is generated randomly or can incorporate prior knowledge about suitable materials (example: metallic bonds for metal alloys, ionic bonds for salts, covalent bonds for organic molecules).

The initial and subsequent populations (generations of materials) undergo a series of genetic operators (such as mutation and cross-over) to generate the next population in an iterative manner.

In one embodiment of the invention, different populations or set of populations can co-exist in the evolutionary computations were parallel genetic algorithms create generations of material classes that evolve in parallel over time.

In a particular embodiment of the invention the user can make selective choice on which generations to let further evolve, which generation to "kill" and possible using a functionality of selective breeding where materials generations created through different parallel evolutionary computing can breed upon user (human) intervention.

The survival of every individual materials generated is evaluated by the mean of the fitness function. For radiation efficient materials the algorithm simultaneously searches for Max $\mathcal{F}(\sigma, \rho)$ and Max $L(S, \rho)$ under the constraint of min $\Delta_f(G)$.

In an embodiment of the invention, simplified fitness functions can be used to reduce the computational complexity at first. Based on preliminary estimations, further detailed calculations can be executed in a second phase.

The material chemical composition (atomic elements, number of atoms, stoichiometry, or relative molecular weight ratio) shall be computed accordingly, under fitness functions optimisation.

The fittest candidate materials are selected from the population, and their genomes are subject to mutation operations to generate the new generation This iterative cycle continues until a maximum number of generation has been produced, or until some members of a population have properties S and a that have reached or exceeded the fitness ranking criteria.

The finally selected material composition is a solution space of chemical compositions within the chemical space.

In evolutionary computing, the evolutionary process and the optimisation of the fitness function goes hand-in-hand. The selection of fittest candidate materials is adjusted in real time (iterations on the population), preferably vis-h-vis the optimal Pareto front of solutions, to simultaneously perform optimisation of more than one property, example the two radiation shielding properties, the density optimisation and Gibbs free Energy minimisation). Note that the invention is not limited to evolutionary computing as Machine Learning models, using a high dimensional neural network for the chemical systems with high values of N, can be used also.

The candidate materials that have been generated using the evolutionary method are subsequently assessed for their radiation shielding properties (in silico radiation shielding performance assessment) according to the following steps:

1. Using a proper set-up of a software version of the Geant4 toolkit. The toolkit is widely used by the space radiation shielding community for the simulation of the passage of particles (radiation) through matter (materials). Its areas of application include high energy, nuclear and accelerator physics.
2. Input the mandatory classes for Geant4 execution: (i) construction class that focuses on the particle detector geometry and allows to change the sensitivity of the detector in different regions, (ii) physics class that defines the particles list, the physics list to use and the energy threshold at which the discrete particle simulation is replaced with a continuous approximation, (iii) particles class that define the initial parameters of the particles and generates the particle source
3. The particle source is generated using the SPENVIS database. ESA's "SPace ENVironment Information System", is a web interface to model of the space environment and its effects; including cosmic rays, natural radiation belts, solar energetic particles, plasmas, gases, and "micro-particles"
4. The HZE radiation type (e.g. heavy ions) for the Geant4 in silico simulation is selected together with the energy of the particle (expressed in eV)
5. The molecular composition of the candidate material is inputted (under "user defined materials") as well as a defined geometry of the material (shape, thickness expressed in mm) and the distance between the particles gun (beam) and the target material. Several layers of different material can be added. The incidence angle of the simulated beam is also provided as an input.
6. The experiment runs with the beam generating a high number of incident particle impacting the target material
7. Data points are extracted from Geant4 and are visualized in using Bragg curves graphs. The Bragg curve is a graph of the energy loss rate, or Linear Energy Transfer (LET) as a function of the distance through the stopping target material. The Total Ionizing Dose (TID) is also extracted from Geant4
8. The Geant4 simulation experiments can be repeated using different Physics Lists.
9. The comparison between Geant4 predicted Bragg curves and Brag curves from actual materials allows to assess the efficiency of the computed material candidate The in-silico assessment of candidate shielding materials is an important control point in the method application, towards the validation of the output produced by the computer implemented search method.

In an aspect of the invention the notion of spaced apart material layers and exploiting such notion is worked out (material layers optimisation).

The term "layer" describes ideally a structural spacecraft component, for instance in the case of a two materials layers configuration, where the design requirements have the debris bumper layer of the spacecraft exposed to the outer space and the rear wall layer of a spacecraft assuring the inner pressurisation.

It is worth emphasizing that the invention is not about a "sandwich panel" type of structural component nor exclusively 3D printed layers of an additive manufacturing process, on the contrary the layered structure preferably relates to a configuration of material layers with each of them having homo-disperse chemical composition. Example: a first layer that is functionally optimized for nuclear fragmentation shielding, spaced apart from a second layer that is functionally optimized for stopping power shielding.

Note that the physical distance between layer 1 (example: (debris) bumper) and layer 2 (example: rear wall) will contribute to reinforce the total nuclear fragmentation cross section and stopping power shielding effect. Hence there is an interplay between the 2 different materials, part of two physically distant layers (structural component of the spacecraft), driven by two factors:
(1) the impact of the physical distance between layers on the total nuclear fragmentation cross section effect, where, the longer the distance between the layers, the higher the dispersion of the fragmented incoming radiation particles will be. The higher the dispersion of fragmented incoming radiation particle (in the 3D Euclidian space), the higher the efficacy of the layer 2 (example: rear wall), as fragmented particles will impact a larger area of layer 2 with less mass-related energy deposit per areal density;
(2) the impact of the physical distance between layers on the stopping power effect where the stopping power being defined as the lateral transfer of charge-related energy over distance, the higher the distance between the layers, the higher the amount of incoming particle beam energy that will be lost with the target shielding material.

The invention is adapted to explore this interplay, for instance, by adapting the shielding property optimisation properties weight factors. Possibly, the said weight factors are to be determined by the considered space mission definition. Examples:
(1) a satellite in a 5 years Low Earth Orbit (LEO) mission will have a lower weight factor for layer 1 (low fluence of heavy ions) and a higher weight ratio for layer 2 (high fluence of protons).
(2) a deep space mission such a trip to Mars, the layer 1 will have higher weight ratio (higher fluence of heavy ions during the journey) and a lower weight ratio for layer 2 (lower fluence of protons during the journey).

Explicitly, different part of the spacecraft involved in the radiation shielding process can have different weight ratio based on their functionality as well, example a descent and ascent crew module capsule to Mars on top of launch rocket or booster, specially designed for a high weight ratio third layer due to secondary radiation.

Note that the distance between layers is typically implicitly addressed during the shielding optimisation process, as both nuclear fragmentation cross section and stopping power are maximized using their ratio to areal density. From a structural spacecraft component point of view, the layer thickness, which can be related also to a weight factor during the optimisation process, is addressed based on design requirements.

From a radiation shielding point-of-view, different thicknesses of an example of a layer 1 (that would be optimised for heavy ion shielding) also impact the total shielding effectiveness. Layer 1 would in this example typically show materials composition with higher average atomic weight (and therefore produces less ionizing secondary particles), hence aiming at a thinner layer 1 for spacecraft payload weight optimisation. In this example, layer 2 would typically benefit from a greater material thickness to benefit from a greater incoming radiation particle travel distance within the target shielding material, made of likely lower atomic weight composition.

In a particular embodiment of the invention these multi-layer and layer weight optimisation sub-methods can be used for design requirement use cases when configurations have more than two layers.

In a particular embodiment of the invention, this shielding layer optimisation sub-method can be used for design requirement use cases when configurations have one or more functional radiation shielding layers in addition to given intermediate functional layers, while evaluating their joint effect.

In an embodiment of the invention, knowing that several input design requirements parameters are typically pre-defined, such as the structural role of each material layer, material thickness and density, distance between material layers, material compositional space (type of engineering material), expected in-flight performance (based on mechanical properties), the method allows to focus on the radiation shielding optimisation under these strict engineering constraints, which can also be inputted by the user during the set-up of the optimisation method (handled further).

In another particular embodiment of the invention, by introducing an optimisation weight factor between radiation-shielding target properties and additional material properties, one user can decide where to put the emphasis on radiation shielding with respect to the additional target properties. In principle one can set one of the radiation shielding optimisation target weight at a low level (up to a close to zero weight factor) in favour of one other additional critical property that is needed by design in the said predetermined amount of material layers present in the design configuration.

For a satellite example, 1 material layer can be optimized at a weight factor of 80% for stopping power shielding parameter to stop protons showers in Low Earth Orbit (LEO), together with +1 additional material layer that is optimized at a 20% weight factor for high altitude atomic oxygen (ATOX) resistance. The latter target property being an additional design requirement property for this particular example that is also a function of chemical composition. In other words, an additional constraint can be added in the optimisation exercise when creating the selected chemical domain for materials with low oxidative potential.

For an on-board space electronics example, 1 material layer can be optimized for sustaining a higher fluence of heavy ions, e.g. a weight factor of 60%, and a second layer optimised for a lower fluence of solar protons, e.g. a weight factor of 30%, completed by a third layer dedicated to secondary X-rays radiations shielding, e.g. a weight factor of 10%.

In a particular embodiment of the invention, similar factors (target objectives) are taken into account to optimise the thermal dissipation of shielded components across the said material shield.

Material Structure Optimisation

So far, the method described the aspects of the invention in relation to physical properties related to material radiation shielding, their optimal density and their stability in terms of Gibbs free energy and, emphasized the direct computation of such properties via formulas. In an important aspect of the invention, it is recognized that for structural/mechanical properties, such direct calculation approach is not feasible and, that introducing engineering constraints in relation thereto is preferably done by using the inherent capabilities of the transfer learning approach: the type of material can be fixed (example: the choice of metal alloys, as an input parameter of the transfer learning) and the design requirements are known (further in the text it will be shown that the transfer learning deep c-NN creates a statistically equivalent model of the pre-determined layer structure made of an alloy).

Moreover, in relation to exploring the structural/mechanical properties of a material, given that crystal structures where not imposed in the chemical composition optimisation, the invention relies on 2D or 3D artificial reconstruction of material microstructure or geometric modelling of synthetic microstructures by the mean of such transfer learning approach.

As mentioned the invention pertains to realistic contexts and therefore aims at structural materials: being the class of engineering materials where metals, polymers and ceramics belong to (by contrast with functional materials only, namely the semiconductors).

The mechanical or structural properties of interest for the invention directly relevant for aerospace (spacecraft) design context are one or more of the following:

Strength
Ductility
Modulus
Fracture Toughness
Fatigue Crack

Under the group of strength related properties belong the strength, tensile strength, ultimate tensile strength, specific strength, yield strength, dynamic strength, creep strength, torsion strength, fatigue strength, stress, strain, and stress-strain properties.

Under the group of ductility related properties belong ductility, necking limit, and the relationship to hardness parameters.

Under the group of modulus related properties belong modulus, Young modulus and specific modulus properties.

Under the group of fracture related properties belong fracture toughness and brittle fracture properties.

Under the group of fatigue related properties belong fatigue crack, fatigue crack growth, crack propagation.

In an embodiment of the invention stress corrosion cracking property can be computed also.

In an embodiment of the invention, long term material temperature stability can also be computed, using a combination of temperature sensitive material microstructure chemical composition parameters and 3D representation of the microstructure ageing over time under the effect of temperature variations.

In another embodiment of the invention, outer space vacuum conditions are taken into account. For example entrapped bubbles of gases entrapped in pores, porosities of the material that can lead to material structural integrity degradation through degassing process.

Each mechanical property can be computed independently.

This aspect of the invention can be phrased as a method for computing or predicting one or more mechanical properties of a structural material, based on information about its microstructure, more in particular by computing how the said structural material can be composed by said microstructures, for instance by modelling features from the geometric domain of said microstructure, in particular those geometric features (also denoted hierarchical features) including control features that enable the mapping of chemical material composition into the geometric model.

Alternatively phrased, the invention is about a method for computing and thereby predicting one or more structural or mechanical properties, simultaneously or independently and possibly together with radiation shielding properties, of a structural material, based on information about the microstructure building blocks, more in particular by computing how the material microstructure scale can be composed by said building blocks, for instance by computing geometric information such as geometric features, image, or geometric properties of said structure.

With microstructure (MS), it is meant the structure of engineering materials that relates to the arrangement of its internal components on a microscopic level, by contrast with arrangement of crystal structures on an atomic level. From the perspective of structural materials, the properties of materials that are relevant for design and manufacturing are determined by the microstructure hierarchical features, their interactions, example at grain boundary level, and the associated mechanisms that occur principally at the microstructural level, such as dislocations and cracks.

In essence the method for computing or predicting one or more mechanical properties of a structural material also use inputs related to chemical information, possibly in the same way or similar way as described above for the radiation shielding optimisation.

The state-of-the-art typically directly relies on the geometric information contained in the microstructure characterization images extracted using TEM, SEM, EBSD, XRD, or by extrapolation of the microstructure using Crystal Structure Prediction methods (CSP).

The present method starts from an empty geometric space of empty shells (or cells) where the microstructure model first belongs to the targeted design space, but where neither the geometric domain nor the material domain have been completely defined yet. In both cases, the state-of-the art solely prescribes the geometric space as the initial reference frame for microstructure reconstruction methods.

The present method then initializes the design space with the algorithmic setup of the geometric domain and the material domain, respectively belonging to the Euclidian space and the material space such as the number of dimensions (2D or 3D images) and selected primary materials. At this stage no more information is needed to enable the first iteration of the method.

The geometric domain is then created in the computer memory, based on the user selected input received from a target material of interest. Example, the material of interest is a block copolymer where the computer created geometric domain will be a biphasic microstructure model. Subsequently in the method, the material chemical composition domain will be functionally mapped into the geometric domain, using for example polymer specific atomic elements selection (further described).

In an embodiment of the invention, as most structural materials (polycrystalline materials) have 3-phases, the computer generated geometric domain is set to encompass 3 phases representation maximum (in 2D or 3D). The input parameter for geometric model generation can be generalised to an n-phase material. The computing method for generating the empty shells space is based on power diagrams, like the Voronoi diagrams generators (further described).

In essence, the invention integrates a step of computing geometric information of material structure comprising the step of generating a (3D-) geometric image, based on information about the chemical composition relevant therefore, in particular by use of a second trained model relating chemical composition to relevant information for such geometry generating (determined by the methods using a Laguerre-Voronoi Tessellation); and thereafter a step of computing enriched geometric properties of said structure from said geometric image, in particular by use of a third trained model.

The method is typically being adapted for exploring a plurality of material phases in which said microstructures can occur.

Based on the input data (atomic elements) the new chemical compositions (N dimension systems) are generated, performing a systematic search in the selected set of chemical elements (the material composition that is part of the chemical domain was defined over the microstructure (MS) domain earlier in the description).

Every new (radiation shielding properties, density and energy) optimized composition is iteratively mapped into the n-phase geometric domain (mapping the material composition onto the geometric domain), in order to progressively generate the material microstructure.

In an embodiment of the invention the method can be extended to perform a systematic search on the entire periodic table, assuming the table is divided in subgroups of interest first (using a zoom-in user function within the computer system), followed by multiple subgroup candidate material optimisation and optimisation on large intersection between the candidate material groups.

In an embodiment of the invention the method can be combined with the field of high-throughput combinatorial chemistry/high-throughput combinatorial evaluation of materials properties, such as post-optimisation of identified candidate materials using the present method, by advanced (not approximated) thermodynamics calculation for high dimension systems. The post-optimisation method typically rely on Density Functional Theory (DFT) calculations, Molecular Dynamics (MD) and calculation of phase diagrams to identify the regions where candidate material phases are stable and regions where two or more of them can coexist.

The final computer generated structural material is ultimately made by the accumulation of all n-phase constituents of the material microstructure within the pre-defined representative volume element. The mapping of the material chemical composition space into the geometrical microstructure space is performed, for example, using a deterministic method for multivariate interpolation such as Inverse Distance Weighting. In particular the geometric space may include geometric features and geometric spatial representation of the microstructure (MS), for example in the form of a Gram matrix, including control features). Note that the material composition at a specific location in the geometric space is evaluated at runtime (iteration) by using the distance between a chosen/given control geometric feature and the location of interest at the said runtime. Different material composition blends will be mapped at the iterated constructive points on boundary curves in the geometric domain.

It is part of the invention to explicitly establish the link between the chemical composition of the radiation shielding material and the material processing steps: (1) from a given set of base materials used in the (additive) manufacturing process, different chemical system may occur with varying final composition; (2) from a manufactured material of a given composition, the internal microstructure building block, geometry, micro- and macro-features will differ.

In an embodiment of the invention, the processing steps of conventional industrial manufacturing are taken into account, such as melting, casting, extrusion, moulding and powder sintering that have a direct physical and chemical impact on the final material composition and geometry.

In an embodiment of the invention, the processing steps of additive manufacturing are taken into account, as for example in the case of high entropy alloys produced through selective laser melting, the parameters: scanning speed (mm/s), power (W), layer thickness ($\mu$m) and hatching space ($\mu$m) are conditioning the end-material microstructure.

Independently from the production process several processing parameters can be applied, in general or particular embodiments of the invention. Examples: (i) temperature of operation at different steps of processing (temperature graded solidification, hot or cold treatment); (ii) pressure of operation at different steps; (iii) atmosphere conditions (air, noble gas, combination of gases, gas atomisation, plasma rotating electrodes); (iv) shaping and forming through machining; (v) other mechanical processing such as hammering; (vi) other techniques such as ultrasonic (gas) treatment, laser spin atomisation, plasma rotating electrodes process, electron beam quenching, laser surface melting.

In the method, geometric features are defined as a range of generic shapes of a microstructure with which certain attributes can be associated for modelling that ultimate microstructure of interest.

Then, features are assigned to the different generated shells (or cells) of the model. This presents an advantage as the computed microstructure model is not built upon pre-defined (pre-trained) models and is not conditioned to a particular feature or group of features.

For reference, the state-of-the-art typically creates a statistical microstructure model only based on machine learning for characterisation and reproduction of the features that have been pre-learned.

The present model does not put a constraint on the type and number of features that can be assigned to the model shells. Geometric features are defined within the model using a hierarchical structure such as external features and internal features. Internal features encompass shells, boundary curves, particles points, etc. while external features define the representative volume element, the number of shells, tolerance errors parameter and definition of shell volumes. The shells in our model are solid primitives that define the overall geometry of a microstructure. The hierarchy of features can be a feature tree structure that includes the data model, data structure and parameters for the material chemical composition mapping function into the shell structure.

For reference, the state-of-the-art in microstructure (MS) modelling typically directly extracts and predicts a geometric features such as grain boundary or dislocation without relying on a feature hierarchy stored in the coded database model. The invention, on the contrary, uses the step of computing said structural properties of a microstructure from said hierarchical geometric features information, in particular by use of a trained model.

By geometric information, at this level of description, it is meant that the geometrical features of the microstructure model are linked with the qualitative microstructure (MS) interpretation (e.g. list and typology of microstructure (MS) geometric features) extracted from characterization techniques (described above) and initiated/reproduced as a model, using the further described deep convolutional network (deep c-NN) where the distribution and topological arrangement of grains size, grain volume, grain boundary, interfaces, twin boundary, and other features in three dimensions such as vacancies, dislocations, edge dislocations are represented. In the further described enrichment part of the invention, geometric features will be integrated within the model in a quantitative way, using for example densities of particular geometric features in the given representative volume element.

In the presently described methods, a generalized transfer learning-based method (first trained model) (approach) can be used.

The method uses the capabilities of a transfer learning approach to establish the link between geometric information, hierarchical microstructures features and the sensitivities of the mechanical properties to the microstructure of the ability to predictively compute the structural material properties by the use a first trained model. The link relates to the spatial representation of the MS image (such as every n pixels or group of pixels in the MS image) includes the information/data about control features that will enable the chemical mapping in the geometric space by the mean of (for instance) Inverse Distance based technique for designing the material blending weight (function).

Conventional machine learning (ML) and deep learning algorithms, so far, have been traditionally designed to work in isolation. These algorithms are trained to solve specific tasks. The models have to be rebuilt from scratch once any of the feature-space distribution sets have been used for a given reconstruction/prediction experiment (here for example, the feature space would refer to the collections of microstructure features that are used to characterize the microstructure related data such as phases, grain size, grain boundaries, etc.). The geometric features are encoded as labels in the computer system database.

Transfer learning is the idea of overcoming the isolated learning paradigm and utilising knowledge acquired for one task to solve related ones, such as predicting mechanical properties of microstructures by making the connection between labelled features and property descriptors within the (deep convolutional) Neural Network (NN). In a possible embodiment the proposed transfer learning-based method migrates a pre-trained deep convolutional network (deep c-NN) model created using an auxiliary dataset which contains a very large number of regular images (up to millions of images if created using ImageNet for example). The migrated d-CNN is the knowledge transferred from one data domain (regular images) to another data domain (microstructure images). As a next step, the method adds encoding-decoding stages before and after the deep convolutional neural network to reconstruct as statistically equivalent microstructure.

The encoding stage can be described as follow: each pixel of the original microstructure image is digitally labelled with material phases into a 3-channel representation (Red-Green-Blue standard or RGB), so that the dimensionality of the image fits the requirements of the transferred d-CNN (example a minimum of $n \times m = 300 \times 300$ pixel resolution is imposed in 2D and a resolution of $n \times m \times o$ in 3D).

For ease of distinguishing individual phases of the material after reconstruction, a mapping function is used from phase labels to the 3D channel representations.

The RGB colour model is an additive colour model in which the red, green, and blue primary colours of an image are added together to reproduce the colour of one pixel within the microstructure image The deep neural network (d-NN) is described as an artificial neural network (ANN) with multiple layers between the input and output layers.

The (deep) Convolutional Neural Network is described as a class of neural networks that specializes in processing data that has a grid-like topology, such as a microstructure image. A convolution is the application of a filter to an input that results in an activation within the neural network.

A convolutional filter is a mathematical operation on two functions that produces a third function expressing how the shape of one is modified by the other. The convolution operation is achieved by a simple mathematical technique of matrix multiplication. The convolutional filtering and extraction technicality of images (and their geometric features), in the form of vector matrices, relies in the values of the DNN kernels and leads to a variety of image processing tasks like edge detection, smoothening, blur, Sharpening etc.

Repeated application of the same filters to an input results in a map of activations called a feature map, indicating the locations and strength of a detected feature in an input, such as a geometric feature within a microstructure image.

In one embodiment of the invention, the method, by the use of a trained model, is able to reconstruct statistically equivalent microstructures from arbitrarily selected materials images based on a single (user selected) target microstructure of interest.

In one particular embodiment of the invention, the microstructure reconstruction takes the following three steps in transferring the deep convolutional neural network into microstructure reconstruction (trained model): (1) d-CNN model pruning: reduce the hierarchical depth of the transferred model for computational economy and efficiency; (2) Gram-matrix computation, which is usually used for measuring the differences in textures between images, is taken as the measurement of statistical equivalence between the original microstructure and the reconstruction; (3) Gradient computation via back-propagation.

The method then adds a decoding stage after the d-CNN: after obtaining the 3-channel representation of the reconstruction, an unsupervised learning approach is used to convert the 3-channel representation back to the desired representation: images with labelled material phases.

As the result of the reconstruction operations, the reconstructed microstructure contains the all the relevant data in the form of a vector matrix of the type $C_{n \times m \times o \times RGB}$ The present method uses Machine Learning to predict the mechanical behaviour (properties) of microstructures composing structural engineering materials. Microstructures are complex, non-linear systems having a high dimensionality of the feature set characterizing the system's state. State-of-the-art mechanical properties prediction typically uses methods such as Finite Element Analysis (FEA) or Computational Homogenization (CH) that are both computationally expensive techniques, especially when considering a plurality of properties.

Given sufficient amount of training data, the present method is capable of learning complex, non-linear mappings from high-dimensional feature vectors to a desired prediction output.

For each mechanical property of interest, the machine learning model (advanced neural network) is trained to infer the said mechanical properties from the pre-existing MS geometric features. The inference process is directed by the following property computing:

Step 1: Each mechanical property can be linked to a particular (or a set of particular) microstructure features characterized form source image. Example: dislocations (crystal defect).

Step 2: Features descriptors are used to represent the actual MS features such as, and not limited to, average, median, variance, skewness and kurtosis of values of interest or density distribution across the geometric space. Statistical property descriptors are typically represented and stored in the computer model as vectors in the Euclidian space. Ultimately each single geometric feature (for example in the empty shell model of the Laguerre Voronoi tessellation—handled further) can be characterized individually by the use of such vectors. Example: Burgers vectors associated with a dislocation (a measure of the lattice distortion caused by the presence of the line defect, coloured in blue or red oriented symbols)

Step 3: Intermediary geometric modelling can take place to represent (statistical) micro defect densities of the said descriptor. Example: densities of geometrically necessary densities (GND). Mathematical representation of the said feature are calculated for each pixel such as a spatial position vector, a density function or a combination thereof (further detailed in the enrichment description).

Step 4: A selected neural network performs a regression on the dataset generated in step 3 and predicts the property value/quantity/curve (iterative data point accumulation) for a new set of MS data observation. Example: stress-strain curves prediction using X-Ray diffraction metal alloy MS images as input.

Here, one may summarize the properties computing process, such that the invention exploits a step of computing geometric information of said material microstructure comprising the step of computer generating a (3D-) geometric image model, for instance by use of a Laguerre-Voronoi Tessellation (further handled), and thereafter a step of computing geometric-related mechanical/structural properties of said material microstructure from said geometric image, in particular by the use of a trained model.

In a particular embodiment of the invention, the specific strength and Young modulus shall be calculated from the material model (statistically equivalent reconstructed microstructure):

The Specific Strength is defined as the ultimate tensile strength (UTS) of a material normalized by its mass density ($\rho$).

The Ultimate Tensile Strength is the point when the energy absorption potential of the material peaks because the summation of the localized energy throughout the material cannot be dissipated by the moving of existing dislocations or the nucleation of new ones.

A machine learning model is implemented to realise strength-related prediction. Using direct observation of microstructure dislocations from the transfer learning approach and using a chemically optimized (radiation shielding optimized) microstructure composition, the model uses Burgers vectors to represent the initial dislocation configuration. The density of geometrically necessary dislocations (GND) can be extrapolated, prior to feed a neural network to infer the relation between the initial dislocation configurations (density) and the ensuing stress-strain values.

Using the stress-strain values, the specific strength and, Young Modulus and specific modulus can be deducted by simple calculation.

In a particular embodiment of the invention, the fracture toughness shall be calculated from the material model:

The fracture toughness Kc of a material is defined as the critical stress intensity factor for immediate crack growth under given conditions. Fracture toughness is a quantitative way of expressing a material's resistance to brittle fracture when a crack is present. If a material has high fracture toughness, it is more prone to ductile fracture. Brittle fracture is characteristic of materials with less fracture toughness.

A machine learning model is implemented for fracture toughness behaviour prediction. Starting from actual materials characterization images from the transfer learning approach and using a chemically optimized (radiation shielding optimized) microstructure n-phases composition, the model takes the stress-strain data from strength-related prediction algorithm to model spatial distribution of phase $n_1$ grains, phase $n_2$ grains etc. (distribution of phase $n_1$, $n_2$, ... ) in the representative volume element. The method uses a sub-model of microscopic fracture initiation process across the microstructure. Projected micro-crack formation in phase $n_1$ grain are propagated into phase $n_2$ grain and across grain boundaries, within the RVE. The fed neural network infers the R-curve for damage tolerant material where the stress intensity to propagate a crack rises as the crack extends into the material. Values of interest are taken directly from the R-curve without additional calculations.

In a particular embodiment of the invention, the fatigue crack predicted behaviour shall be calculated from the material model:

Fatigue cracking is one of the primary damage mechanisms of structural materials components. Fatigue cracking results from cyclic stresses that are below the ultimate tensile stress (UTS). Crack growth due to cyclic loading is called fatigue crack growth.

A machine learning model for fatigue crack prediction is implemented. Starting from actual materials characterization images from the transfer learning approach and using a chemically optimized (radiation shielding optimized) microstructure n-phases composition, the model takes the initial geometry with initial crack as input together with a crack-propagation model. The neural network uses the learned physical meaning from relations between fracture patterns and geometries to predict a temporary output of the next crack. The temporary input is the re-entered as a new geometry in the neural network, until a final output is reached (when specific crack end-conditions are met) and fracture patterns (over time) are predicted.

In a preferred embodiment of the invention, one uses Laguerre diagrams. A Laguerre diagram is a class of weighted Voronoi Diagram or Power Diagrams or Radical Voronoi Tessellations, which provide a more accurate description of the geometry of polycrystalline materials than classical Voronoi diagrams.

In such an embodiment, the method relies on a computer programmed algorithm for creating power diagrams with user-defined microstructure parameters such as shells/cell size distribution; The cell size distribution with the power diagram represent the microstructure grain size distribution within a given Representative Volume Element (RVE).

The material structural level of interest is the microscopic level. Here, large groups of atomic arrangements are considered as components of the microstructure, which determines most of the properties of the material. As previously described, the microstructure of engineering materials is prescribed by the grain size, types of phases present, and the description of their structure, shape, and size distributions. The grains in a microstructure or the empty shells/cells of the generated Laguerre Voronoi Tessellation represent individual crystals within the polycrystalline material (a posteriori linkage to crystal structure prediction).

The material (generic) microstructure 3D representation (model) is (randomly) generated using a power diagram generating algorithm (synthetic microstructure generation), using a minimal set of input criteria:
  The desired number n of grains/phases within target material microstructure;
  A geometric domain of defined dimensions such as a convex polyhedron;
  A set of distinct points $x_i$ in the geometric domain, with i=1 to n;
  A set of weight $w_i$, where i=1 to n; The ratio of each different grain/phase type is calculated from information contained within the deep c-NN layers, or provided by the user.

The Laguerre Diagram provides a complete geometric material microstructure representation such that:
  The number of grain is controlled and aligned with the method's phase/grain input parameters;
  The size distribution of grains is controlled;
  The spatial distribution of grain is controlled;
  The periodicity of grain/phases can be controlled;
  The diagram has minimal volume errors.
  Power diagrams provide an accurate description of the geometry of polycrystalline materials.

The geometric information acquired through microstructure image measurements is propagated into the Laguerre Voronoi diagram such that the synthetic microstructure model integrates microstructure internal features within a complete geometric representation of a shell/grain and groups of shells/grains.

In a particular embodiment of the invention, fitting the power diagram to microstructure image measurements of the grain volume and grain centroid (the centre of mass of a uniform density microstructure) is achieved:

The centroids, $\mu_i$ and target volumes, $V_i$ of the individual grains (or cells of the power diagram) of a 3D polycrystal can be obtained by microstructure characterisation technique such as 3D X-ray diffraction microscopy (3DXRD), Electron Back-Scattering Diffraction (EBSD) or Computed Tomography (CT Scan);

Grain are identified by their region R; in the shell/cell/voxel structure;

The number of grain in the RVE, such as the grain crystal lattices orientations are also obtained using the characterization technique (a posteriori intake from crystal structure);

A fitting tolerance (E) is defined, for example $\epsilon=1\%$

The microstructure geometric properties grain size (or volume), centroid location and aspect ratio are fitted by minimising a measure of the fitting error, the discrepancy measure, using deterministic and stochastic optimisation methods;

The discrepancy measure is selected based on its ability to be fast evaluated such as an interface-based discrepancy measure, a measure that considers only the boundaries between cells;

To solve the high-dimensional fitting optimisation problem, a stochastic optimisation method is to be chosen and applied;

The cross-entropy (CE) method is such a stochastic optimisation method that is able to solve difficult optimisation problems, including combinatorial optimisation problems and continuous optimisation problems with many local minima;

The fundamental idea of the method particular embodiment is to describe the location of the global minimum of a multi-dimensional cost function in terms of a multi-dimensional probability distribution.

The method allows to:

Obtain a generalized model for microstructure 2D and 3D modelling, providing the basis for the statistical analysis of grain structures;

Contain all the relevant data in the power diagram model in the form of vector matrix of the type $V_{n \times m \times o \times Ri}$;

Make use of a model suitable for generic engineering materials prediction: metal alloys, polymers, ceramics and possibly semiconductors;

Create new random Laguerre diagrams to discover rich family of possibly never-observed microstructures having new physical and mechanical properties;

Possibly post-optimise grain geometries, taking into account the processing and post-processing parameters;

Lead to the development of new structural materials at processing/manufacturing level.

By further generalising the method, the generic shell/cell/voxel model can be further elaborated such as the following technical steps:
  (i) Prediction of the material mechanical properties using the overall modelled microstructure on the basis of the morphology: volumes of the grains, diversity of grain types within the RVE; microstructure cells that represent other compounds such as pores, dislocations, precipitates and molecular aggregates; grain boundaries.
  (ii) Global optimisation of a model such as described in (i) using methods to optimise grains volume, grain fractions, dislocation dispersion in view of material performance optimisation and
  (iii) Enrich the fitted model (handled further) of (i) with additional microstructure geometric features that were not initially modelled by power diagram cells or, geometric features that were not initially present in actual microstructure characterization images. Example: introduction of dislocations that were not initially captured or modelled.

The method takes a further step where a functionality in the algorithm is developed to map the candidate material chemical composition into the microstructure geometry (chemical composition functional mapping):

The candidate material chemical composition is the output produced by the evolutionary method;
The material chemical composition belongs to the materials domain $\Omega_M$
Example: composition C: {A, B, C, D} where A, B, C and D have different chemical composition and different molecular weight fraction.
The microstructure geometry is the microstructure power diagram representation or the reconstructed microstructure image or the combination of the two.
The microstructure geometry is contained in one RVE of size [0,1]×[0,1] (in 2D)
The microstructure geometry has n grains of different size (volume) in the RVE
The material distribution (chemical composition) within the microstructure is defined by mathematically mapping from the materials domain $\Omega_M$ to the geometric domain $\Omega_G$ using a function g: $\Omega_M \rightarrow \Omega_G$
The function g is expressed as the summation of all material blending weights $w_j$ for each constructive point $P_j$ of composition k over any boundary curve $C_m$ within the microstructure convex geometric domain.
In a simplified version, g is defined as: $g(C_m)=\Sigma_j w_j P_j$
The molecular weight fraction being defined as part of the candidate material compound, a relative weight can be assigned for the corresponding grain regions of the microstructure (the grain regions being delineated by boundary curves within the geometric domain).
Example: A drives $R_1$, B drives $R_2$, C drives $R_3$ and D drives $R_4$, where candidate material composition A to D has been mapped into the microstructure geometry, and $R_1$ could be assigned as a domain phase (grain), while $R_2$ to $R_4$ could be assigned to other material phases (grain) or other features such as precipitates, impurities, etc.
The said algorithm functionality development encompass diagram generation with different grain size distribution to model the microstructure of interest.
The said algorithm allows the user to have an alternative starting point of the microstructure generation method, where a synthetic microstructure is generated based on a pre-selected type of engineering material. In that particular embodiment, the chemical composition is not driving the microstructure and the chemical composition would then be a posteriori mapped into the geometry.

The further enrichment of the Laguerre-Voronoi Tessellation diagrams and reconstructed microstructure models by information about the chemical composition, relevant for the geometric properties of said structure, preferably said enriched information being provided by use of a third trained model is now further detailed. While the second trained model is providing generic information about the selected type of material (metal alloy, polymers, ceramics, composites, etc.), the third trained model will enrich the 3D Laguerre Tessellation, or reconstructed image, with additional specific information, based on chemical composition input characteristics.

The enrichment steps are performed using superposition of (formatted) images by the mean of matrix-encoded images additions.

The model enrichment can take place at different microstructure modeling iteration steps, based on user selection and material design requirements:

(1) Enrichment based on information about the chemical composition: grains, sub-grains/domains, second phases, molecular aggregates, intermetallic particles, precipitates particles, dispersoids particles, inclusions, and possible contaminants;
For example in polymers, the model can be enriched with molecular aggregates of various structures, stabilized in a loose network (amorphous polymer) or confined in between lamellae (in crystalline polymer).
For examples for metal alloys, the model can be enriched with intermetallics (intermetallic particles), that are compounds made up of two or more elements, producing a new phase with its own composition, crystal structure and properties. Both stoichiometric and nonstoichiometric compounds can form. The former have a fixed composition (e.g. $Fe_3C$ in steels, $Mg_2Ca$, AlSb) whilst the latter show a range of compositions (e.g. nickel aluminides, MoRh).
For example in ceramics, the model can be enriched with impurities that form "glassy" phases often contained at the intersection of the grains where he grain boundaries are formed; enriched with pores that are formed due to the inability of the ceramic powder to sinter to full density.

(2) Enrichment based on distribution and topological arrangement of grain size, grain volume, grain boundary, interfaces, twin boundary, vacancies, dislocations, edge dislocations;
Example: in certain conditions (metal alloys microstructure) models can be enriched with (chemical composition) inclusions made of different type of materials such as cementite films ($Fe_3C$) at grain boundaries, or inclusions made of nanoparticles with different shapes, densities and compositions.
For example in thermoplastic elastomers, the model can be tuned to display macro-blends in the matrix and can be enriched with representations of thermodynamic adhesions (lines) and contaminants at the interface between transition zones.

(3) Enrichment based on geometric information about the microstructure at the macro-scale from the group of: holes, voids, microvoids, cleavage facets, pores, porosities, cracks, microcracks, shrinkages, distortions, macro-aggregates, and all related defect densities such as voids density, pores density;
For example in composites, such as glass-fiber reinforced polymers, microstructure models can be enriched with porosities of different levels.
The model (the method) (of using Laguerre Tessellation) can be applied to lower density materials of materials with other structural properties such as foams, aerogels (containing a high density of macro pores) and fabric-like fibers (such as aramid fibers). Such materials being of interest as they can be optimized for radiation shielding and tear and wear resistance for applications such as Extra Vehicular Activities (EVA) space suits.

In particular, advanced optimisation of microstructures (which are those based on enriched tessellations) can be applied to control the mechanical properties of radiation shielding optimised materials such as dislocation distribution controlling strength, fatigue cracks behaviour near grain boundaries, inference of atomic arrangements (and possible further relaxation of crystal groups as post optimisation) and overall phases morphologies.

The invented method provides a complete 2D/3D structural model of the target structural material including composition of that material, hence its output can be further used in Additive Manufacturing (AM) (3D printing) where one can enable printer nozzle toolpath planning and related functions/parameters.

The present method provides a full predictive model with backward and forward CPSPP predictors (as further defined), in-situ manufacturing process sensors can be linked to retro-feed (real-time) data into the Machine Learning Model for adaptive learning/reinforcement learning purposes.

The method can provide a rational design procedure and process to manufacture target materials only using atomic elements that would be available under certain conditions (via restricting the input space/chemical environment) and where AM would be the sole or preferred method of production.

By combining a plurality of target mechanical and physical properties one can define a given target performance of the material. Conversely, the method allows to start from high level materials performance goals (design requirements) backwards to material composition.

The central problem of materials science is to decipher, in an appropriate tractable way, the linkage (relationship) between its five core points, which include the chemical composition, microstructure, manufacturing process, property and the performance in service via forward and backward trained models. The invention provides a solution for handling these core points together: Composition-Process-Structure-Property-Performance (CPSPP).

The invention can in more general terms being described as follows:

The invention pertains to computer implemented or computer assisted generating of structures and hence require computation steps either as part of property or objective computations or predictions or as part of the optimisation method employed on a computer environment or system; and hence loads input material composition on a computer and output the computed properties or the finally selected structures or the definition thereof by said computer. Optimisation methods use typically iterative processes and hence the compute steps are executed also iteratively. Computation can be performed by computing a given deterministic model or by physics-inspired formula, selected to be sufficiently accurate while still being tractable, or by use of a training model, representative for a well selected data set, preferably avoiding iterations within said prediction computations. The training of such model is also based on an optimisation method aiming that the trained model represents the predicted data set is as good as possible in terms of validating the trained model parameters and checked against under- or over-fitting.

The invention is more in particular being based on evolutionary computation or optimisation algorithms such as genetic algorithms, hence being capable of generating (defining) chemical compositions of one or more structures via an evolution engine generating populations of individuals (materials) and the multi-objective optimisation method evaluates via an evaluation engine fitness score for said individuals (materials) on which a portion of the variants are retained and serves as basis for further generations of candidate materials Finally one can summarise that the invention provides a method for computing 'as radiation shielding property of a material', the fragmentation by said material of high charge high energy particles (HZE) into lighter energy particles, based on information about the chemical composition (the atoms, the amount of atoms), more in particular by computing the shielding material total nuclear cross section of said material from said chemical composition, for instance by the use of a Boltzmann like equation or a simplified or generalized version thereof, possibly selecting the most appropriate equation depending on the type of shielding material aimed for.

The invention further provides a method for computing 'as radiation shielding property of a structure', the (lateral) transfer of energy from radiation to said material by ionisation energy loss, based on information about the chemical composition (the atoms, the amount of atoms), more in particular by computing the stopping power of said material, from said chemical composition, for instance by use of the Bethe-Bloch equation or a simplified or generalized version thereof possibly selecting the most appropriate equation depending on the type of shielding material aimed for.

The invention uses the above computational sub-methods as part of an integrated computer implemented method of generating (defining) chemical compositions of one or more materials, being based on an multi-objective optimisation method, including as objectives both the fragmentation by a material of high charge high energy particles (HZE) into lighter energy particles and the transfer of energy from radiation to a material by ionisation particle, preferably the method being based on evolutionary computation or optimisation algorithms such as genetic algorithms.

The invention provides methods for computing one or more structural properties of a structure, selected from the group of: strength, modulus, fracture toughness or fatigue crack, based on geometric information about the material structure, its microstructure building blocks, more in particular by computing how the microstructure can be composed by said building blocks, for instance by computing geometric information (geometric features (image) or properties) of said structure.

The invention uses training models for such purpose.

The methods compute geometric information of said microstructure and such methods are comprising the step of generating a (3D-) geometric image, based on information about the chemical composition relevant therefore, in particular by use of a second trained model relating chemical composition to relevant information for such geometry generating method for instance by use of a Laguerre-Voronoi Tessellation; and thereafter a step of computing enriched geometric properties of said structure from said geometric image, in particular by use of a third trained model.

Information for such geometry generating method can be the following input parameters to generate an "empty shell" Laguerre Voronoi Tessellation:

a geometric domain $[1, 0] \times [0,1]$ (in 2D) representing a sample of material
a list of grain volumes $m_1, \ldots m_n$
a relative error tolerance epsilon (towards volume)
a number of grains n Again such method is used for generating (defining) chemical compositions of one or more structures, being based on a multi-objective optimisation method, including as objectives a plurality of structural properties, preferably the method being based on evolutionary computation or optimisation algorithms such as genetic algorithms.

The invention, both for the radiation shielding property, mechanical property or combined properties is capable of handling one or more layered shielding material structures (with a predetermined amount of layers), by use of weight factors for the objectives, wherein these methods are applied for each of said layers separately with another weight factor for these objectives, preferably these methods being based on evolutionary computation or optimisation algorithms such as genetic algorithms.

While so far the invention has been explained primarily as one or more (combined or integrated) methods, the reader will appreciate that equally related calculation devices pertaining thereto can be described, especially those suited for evolutionary computing such as a calculation device configured to search the composition space of materials or structures (alloys or composites of interest) as part of the designing of such materials or structures with desired material characteristics, said calculation device comprising: a first-generation gene generating section configured to generate a gene group including genes each of which indicates a material its chemical composition and/or material processing steps; and an optimisation calculation section configured to select, based on an evolutionary algorithm, a gene indicating a material its chemical composition which become closer to optimized material characteristics, in particular one or more radiation shielding properties the evolutionary algorithm being an algorithm in which evaluation of fitness of each of the genes included in the gene group and update of the gene group based on the evaluation are repeatedly carried out. The invention also includes control programs for causing a computer to serve as a calculation device as recited above, said control program causing the computer to serve as the first-generation gene generating section and the optimisation calculation section and a computer-readable recording medium that stores a control program recited above.

As said the invention has been explained as one or more methods and the reader may appreciate those described in an evolutionary computing setting such as a computer-implemented method for searching for structures comprising the steps, performed by a processor comprising: input initial data, which consist of at least one property to optimize, and at least the maximum level of complexity of the systems; construction of the search space of dimension N, where N—maximum level of complexity of the systems, at least along the axes of which all the chemical elements and/or complex ions are arranged in one or another way, each point of the search space contains for the corresponding set of chemical elements all their possible compounds, with all possible structures; and when necessary additional parameters pertaining to material processing steps, searches at selected points of the search space; in relation to the property to be optimize, characterized in optimisation of chemical or physical properties, in particular one or more structural or mechanical properties selected from the group of hardness, fracture toughness or ductility parameters, elastic moduli, preferably in combination with thermodynamic stability, one or more radiation shielding properties, or combinations thereof, wherein in the case of selecting multiple properties, multi-objective optimisation is performed.

Alternatively the invention can be described as a computer-implemented method for searching for structures comprising the steps, performed by a processor comprising: input initial data, which consist of at least one property to optimize, and at least the maximum level of complexity of the systems; construction of the chemical space of dimension N, where N—maximum level of complexity of the systems, along the axes of which all the chemical elements and/or complex ions are arranged in one or another way, each point of the chemical space contains for the corresponding set of chemical elements all their possible compounds, with all possible structures; evolutionary searches at randomly selected points of the chemical space; carrying out a cycle of actions, which includes: ranking the search results by their fitness; generating on the basis of fitness new chemical systems, and including also several randomly selected systems; if the chemical systems with the best fitness do not change over a sufficiently large number of iterations, the cycle is completed; otherwise, new chemical systems are generated and the cycle is repeated, characterized in optimisation of chemical or physical properties, in particular one or more radiation shielding properties, preferably in combination with thermodynamic stability, or combinations thereof, wherein in the case of selecting multiple properties, multi-objective optimisation is performed.

In summary one may state that the invention pertains to methods for searching the composition space of materials or structures (alloys or composites of interest), as part of the designing of such materials or structures with desired material characteristics, the method comprising the steps of: importing for ingesting the materials data, predicting for predicting the material properties of interest given the materials data ingested, wherein the predicting is based on physics-based models for one or more radiation shielding properties, and the predicting is based on a machine learning predictor for one or more structural or mechanical properties and related apparatus for searching the composition space of materials or structures (alloys or composites of interest), as part of the designing of such materials or structures with desired material characteristics, the apparatus comprising: an importing module for ingesting the materials data; and a predicting module for predicting the material properties of interest given the materials data ingested, wherein the predicting is based on physics-based models for one or more radiation shielding properties, and the predicting is based on a machine learning predictor for one or more structural or mechanical properties.

The invention explains methods of producing material characteristics pertaining to structural or mechanical properties from an image, the method comprising: obtaining, at a processor, an image, applying, in the processor to the image, an image-to-material characteristics conversion engine, trained with a machine learning model, wherein preferably the machine-learning model comprises at least one artificial neural network (ANN) regression model, suited in the field of image processing and related apparatus for producing material characteristics pertaining to structural or mechanical properties from an image, the apparatus, comprising: a processor and a memory, the processor having an image-to-material characteristics converter module trained with a machine-learning model and using an image.

The invention claimed is:

1. A search method for determining one or more materials having a suitable property, the method comprising:
   (A) performing, with a computer, an optimization method on a plurality of chemical compositions, the optimization method comprising iteratively:
      (i) loading information about a chemical composition and material processing steps for the chemical composition, the information pertaining to a presence of one or more features selected from grains, sub-grains/domains, second phases, molecular aggregates, intermetallic particles, precipitate particles, dispersoid particles, inclusions, possible contaminants, or material processing steps; and (ii) computing one or more structural properties of a material from the loaded information about the chemical composition, wherein the one or more structural properties are selected from strength, tensile strength, ultimate tensile strength, specific strength, yield strength, dynamic strength, creep strength, torsion strength, fatigue strength, stress, strain, stress-strain, ductility, necking limit, relationship to hardness parameters, modulus, Young's modulus, specific modulus, fracture toughness, brittle fracture, fatigue crack, fatigue crack growth, or crack propagation;

(iii) evaluating the material and the one or more structural properties against a fitness function to determine whether the material has the suitable property; and (iv) selecting the chemical composition as a selected chemical composition if the material has the suitable property; and (B) outputting the selected chemical composition, atoms and number of atoms in the selected chemical composition, and material processing steps for the material.

2. The search method of claim 1, wherein:
in (A) (ii), at least two structural properties are computed by use of trained models; and
the optimization method is a multi-objective optimization method, based on all the computed structural properties.

3. The search method of claim 2, wherein:
in (A) (ii), at least two structural properties are computed; and
the optimization method is a multi-objective optimization method, based on all the computed structural properties; and
for each of the structural properties separate trained models are used.

4. The search method of claim 1, wherein (A) (i) comprises:

(a) computing, by use of a second trained model, geometry generating information from the information about the chemical composition and material processing steps; and (b) generating a geometric image, by use of a Laguerre-Voronoi Tessellation method, from the computed geometry generating information to obtain a generated image; and (c) computing the structural properties of a structure from the geometric image by use of a first trained model.

5. The search method of claim 4, wherein:
generating the geometric image further comprises enriching the geometric image by adding enriched information on the generated image;
the enriched information is computed from the chemical composition and material processing steps by use of a third trained model;
the enriched information comprises one or more features selected from holes, voids, micro voids, cleavage facets, pores, porosities, cracks, microcracks, shrinkages, distortions, macro-aggregates, weld tracks, un-melted powder particles, and defect densities.

6. The search method of claim 4, comprising:
training a third model for computing for a given chemical composition and material processing steps, enriched information, the third model, inputted with chemical composition including atoms and number of atoms and material processing steps and outputting enriched information, the training of the third model being based on:

(i) loading a plurality of chemical compositions and material processing steps and their related enriched information; and ii) training, by adapting the third model parameters, the third model, based on the loaded information by comparing the enriched information provided by the third model with the loaded related enriched information; and wherein:
generating a geometric image, based on computed geometry generating information further comprises the step of enriching the geometric image by adding enriched information on the generated image,
the enriched information is computed from the chemical composition and material processing steps by use of a third trained model,
the enriched information comprises one or more features selected from holes, voids, micro voids, cleavage facets, pores, porosities, cracks, microcracks, shrinkages, distortions, macro-aggregates, weld tracks, un-melted powder particles, or defect densities.

7. The search method of claim 5, wherein:
at least one of the first model, the second model, or the third model is a neural network; and
the training provides weights of the neural network.

8. The search method of claim 1, wherein the optimization method further comprises iteratively computing a radiation shielding property of the chemical composition based on the loaded information.

9. The search method of claim 8, wherein:
at least two radiation shielding properties are computed; and
the optimization method is a multi-objective optimization method, based on all the computed structural properties.

10. The search method of claim 8, wherein the radiation shielding property is computed by computing a nuclear fragmentation by the chemical composition of high charge high energy particles (HZE) into lighter energy particles, based on the information about the chemical composition, by computing a material total nuclear fragmentation cross-section from the information about the chemical composition.

11. The search method of claim 8, wherein the radiation shielding property is computed by a method for computing a radiation shielding property of a structure, the stopping power of the structure by ionization energy loss, based on information about the chemical composition, by computing from the chemical composition a local energy deposition from the radiation to the structure.

12. The search method of claim 1, further comprising computing the material Gibbs free energy or the material and/or the formation enthalpy of the material from the chemical composition and the optimization method based on all the computed structural properties.

13. The search method of claim 1, further comprising computing the density of the material from the chemical composition, and wherein:
the optimization method is based on optimizing one or more radiation shielding properties value divided by a density value of the material; and optionally the computed density is used as part of computing one or more of the computed structural properties.

14. The search method of claim 1, wherein the optimization method is adapted for generating one or more layered structures, optionally with a predetermined amount of layers, each being different layers of different materials, by loading a weight factor for structural properties for each of the layers, and a multi-objective optimization method is applied for each of the layers separately with another weight factor for these structural properties.

15. The search method of claim 14, wherein the optimization method takes into account primary and secondary radiation aspects by computing for at least one layer, the impact of at least one radiation shielding property for each of the two types of primary and secondary radiation.

16. The search method of claim 1, wherein:
the optimization method is based on evolutionary computation or optimization algorithms or genetic algorithms that are based on an evolution engine generating populations of individual materials; and
the multi-objective optimization method evaluates via an evaluation engine fitness score for the individual materials on which a portion of variants are retained and serve as basis for further generations of candidate materials.

17. The search method of claim 1, wherein the materials are chosen from metals, polymers, and ceramics.

18. The search method of claim 1, wherein the material processing steps are chosen from melting, casting, extrusion, molding, powder sintering, heat treatment, shaping/forming, solidification, or mechanical processing.

19. The search method of claim 1, wherein the optimization method comprises iteratively computing a stress corrosion cracking property.

20. A non-transitory machine-readable storage medium storing a computer program product comprising computer-readable code that, when run on a computer system, causes the computer system to execute the search method of claim 1.

21. A search method for determining one or more materials having a suitable property, the method comprising:
(A) training a first model for computing geometry generating information for a given chemical composition and material processing steps, the training of the first model comprising:
  (i) loading, as first-model loaded information, a plurality of chemical compositions and material processing steps and their related geometry generating information; and
  (ii) adapting parameters of the first model based on the first-model loaded information by comparing geometry generating information output provided by the first model with the related geometry generated information of the first-model loaded information;
(B) training a second model for computing a structural property from a given geometric information, the given geometric information being a geometric image, the training of the second model comprising:
  (i) loading, as second-model loaded information, a plurality of images and their related structural property; and
  (ii) adapting parameters of the second model based on the second-model loaded information by comparing structural property output provided by the second model with the related structural property information of the second-model loaded information;
(C) performing, with a computer, an optimization method on a plurality of chemical compositions, the optimization method comprising iteratively:
  (i) loading information about a chemical composition and material processing steps for the chemical composition, the information pertaining to a presence of one or more features selected from grains, sub-grains/domains, second phases, molecular aggregates, intermetallic particles, precipitate particles, dispersoid particles, inclusions, possible contaminants, or material processing steps; and
  (ii) computing one or more structural properties of a material, the one or more structural properties selected from strength, tensile strength, ultimate tensile strength, specific strength, yield strength, dynamic strength, creep strength, torsion strength, fatigue strength, stress, strain, stress-strain, ductility, necking limit, relationship to hardness parameters, modulus, Young modulus, specific modulus, fracture toughness, brittle fracture, fatigue crack, fatigue crack growth, or crack propagation; and
  (iii) computing geometry generating information from the chemical composition and material processing steps by:
    (a) inputting into the first model the chemical composition including atoms and number of atoms and material processing steps; and
    (b) outputting the geometry generating information from the first model;
  (iv) generating a geometric image based on the geometry generating information from (iii) by use of a Laguerre-Voronoi Tessellation method; and
  (v) computing the structural properties of a structure from the geometric image by:
    (a) inputting the geometric image of (iv) into the second model; and
    (b) outputting a structural property from the second model; and
(D) outputting the selected chemical composition, atoms and number of atoms in the selected chemical composition, and material processing steps for the material.

22. The layered structure comprising a plurality of layers of materials determined by the search method of claim 1, wherein a multi-objective optimization method is used for determining the layered structure by loading a weight factor for structural properties and/or radiation shielding properties for each of the layers and separately applying for each of the layers another weight factor for the structural properties and/or radiation shielding properties.

23. The layered structure of claim 22, wherein each layer of the plurality of layers is of different material.

24. The layered structure of claim 22, wherein at least one layer of the layered structure is of a material determined by taking into account primary and secondary radiation aspects by computing the impact of at least one radiation shielding property for primary radiation and secondary radiation.

25. The layered structure of claim 22, wherein one of the radiation shielding properties is nuclear fragmentation by a structure of high charge high energy particles (HZE) into lighter energy particles, being the material total nuclear fragmentation cross-section of the structure from the chemical composition.

26. The layered structure of claim 22, wherein one of the radiation shielding properties is the stopping power of the structure of the material by ionization energy loss, being the local energy deposition from the radiation to the structure.

27. The layered structure of claim 22, wherein the materials are chosen from metals, polymers, or ceramics.

\* \* \* \* \*